United States Patent [19]

Lauw

[11] Patent Number: 5,239,251
[45] Date of Patent: Aug. 24, 1993

[54] BRUSHLESS DOUBLY-FED MOTOR CONTROL SYSTEM

[75] Inventor: Hian K. Lauw, Corvallis, Oreg.

[73] Assignee: The State of Oregon Acting by and through the State Board of Higher Education on Behalf of Oregon State University, Eugene, Oreg.

[21] Appl. No.: 742,568

[22] Filed: Aug. 7, 1991

Related U.S. Application Data

[63] Continuation of Ser. No. 374,345, Jun. 30, 1989, abandoned.

[51] Int. Cl.$^5$ .............................................. H02P 5/34
[52] U.S. Cl. ...................................... 318/767; 290/31; 290/38 R; 318/721; 318/809; 388/930; 322/47; 323/205
[58] Field of Search ............... 318/737, 722, 729, 809, 318/721, 803, 810, 767, 730, 832; 388/930; 322/47, 24, 32, 10; 323/203, 204, 205; 290/40 C, 40 B, 40 R, 31, 38 R

[56] References Cited

U.S. PATENT DOCUMENTS

| | | | |
|---|---|---|---|
| 3,617,838 | 11/1971 | Brandt | 318/766 |
| 3,781,616 | 12/1973 | Mokrytzki et al. | 318/801 |
| 3,975,646 | 8/1976 | Kilgore et al. | 307/21 |
| 4,001,666 | 1/1977 | Grenfell | 322/4 |
| 4,039,909 | 8/1977 | Baker | 318/197 |
| 4,070,605 | 1/1978 | Hoeppner . | |
| 4,096,557 | 6/1978 | Schwarz | 363/9 |
| 4,132,931 | 1/1979 | Okuyama et al. | 318/732 |
| 4,227,136 | 10/1980 | Roesel, Jr. | 318/701 |
| 4,249,120 | 3/1981 | Earle | 318/729 |
| 4,277,735 | 7/1981 | Okuyama et al. | 318/766 |
| 4,344,025 | 8/1982 | Okuyama et al. | 318/729 |
| 4,392,099 | 7/1983 | Kuniyoshi | 318/803 |
| 4,401,938 | 8/1983 | Cronin . | |
| 4,426,611 | 1/1984 | Espelage et al. | 318/798 |
| 4,455,522 | 6/1984 | Lipo | 318/809 |
| 4,476,424 | 10/1984 | Kalman | 318/737 |
| 4,503,377 | 3/1985 | Kitsbayashi et al. | 318/807 |
| 4,517,467 | 5/1985 | Führing . | |
| 4,672,298 | 6/1987 | Rohatyn | 323/208 |

OTHER PUBLICATIONS

Murphy, J. M. D., *Thyristor Control of AC Motors*, Pergamon Press, 1973, pp. 159-169.

(List continued on next page.)

Primary Examiner—William M. Shoop, Jr.
Assistant Examiner—John W. Cabeca
Attorney, Agent, or Firm—Klarquist, Sparkman, Campbell, Leigh & Whinston

[57] ABSTRACT

An AC variable speed drive (VSD) system having a brushless doubly-fed motor receives power from an electric power grid at a system frequency of the grid and drives a mechanical load. The motor has a rotor with rotor windings and a stator with stator windings comprising first and second polyphase stator systems. The first stator system receives power from the grid at the system frequency. A sensor senses a parameter of the received power by the drive and produces a corresponding power sensor signal. A VSD controller receives and processes the power sensor signal and a reference signal which has been established according to a desired motor operation strategy, and generates therefrom a controller signal. A converter, such as a power electronic converter, receives and converts power from a converter power source according to the controller signal to produce excitation power at an excitation frequency. The converter injects the excitation power into the second stator system at the excitation frequency. An AC variable speed drive, a VSD controller, and a frequency source excitation power generator are each described.

A related method of controlling an AC variable speed drive is also described. An additional method of controlling a brushless doubly-fed motor driving a load at infinitely variable speeds between substantially zero speed and an upper speed limit while maintaining substantially synchronous operation at any such speed is also described.

33 Claims, 12 Drawing Sheets

U.S. PATENT DOCUMENTS

| | | |
|---|---|---|
| 4,694,189 | 9/1987 | Haraguchi et al. . |
| 4,701,691 | 10/1987 | Nickoladze ............................ 322/32 |
| 4,710,692 | 12/1987 | Libert et al. ......................... 318/729 |
| 4,723,104 | 2/1988 | Rohatyn ............................... 318/813 |
| 4,743,777 | 5/1988 | Shilling et al. . |
| 4,757,240 | 7/1988 | Mizobuchi et al. . |
| 4,791,309 | 12/1988 | Payne et al. . |
| 4,794,316 | 12/1988 | Uchino et al. . |
| 4,806,781 | 2/1989 | Hochstetter . |
| 4,816,696 | 3/1989 | Sakayori et al. . |
| 4,982,147 | 1/1991 | Lauw . |
| 4,994,684 | 2/1991 | Lauw et al. . |
| 5,028,804 | 7/1991 | Lauw . |

OTHER PUBLICATIONS

J. L. Hunt, "A New Type of Induction Motor," Proc IEE, vol. 39, pp. 648-667, 1907.

F. Creedy, "Some Developments in Multi-Speed Cascade Induction Motors," Proc IEEE, vol. 59, pp. 511-532, 1921.

A. R. W. Broadway and L. Burbridge, "Self-Cascaded Machine: A Low-Speed Motor or High-Frequency Brushless Alternator," Proc IEE, vol. 117, No. 7, pp. 1277-1290, Jul. 1970.

A. Kusko and C. B. Somuah, "Speed Control of a Single-Frame Cascade Induction Motor with Slip-Power Pump Back," IEEE Transactions on Industrial Applications, vol. IA-14, No. 2, pp. 97-105, 1978.

H. K. Lauw, "Characteristics of the Doubly-fed Machine in a Hydro Variable-Speed Generation System," Final Report, USDOE Bonneville Power Administration Contract No. 79-85BP24332, Jun. 1986.

H. K. Lauw, "Variable-Speed Generation with the Series-Resonant Converter," Final Report, USDOE Bonneville Power Administration Contract No. 79-85BP24332 Mod-1, Jan. 1987.

Power Technologies, Inc., "Variable Rotor Speed for Wind Turbines: Objectives and Issues," EPRI AP-4261, Sep. 1985.

M. Ohi and J. C. Kaskian, "Dynamic Characteristics and Speed Feedback Stabilization of the Doubly Fed Machine," IEEE Paper A76 413-5, Power Engineering Society, Portland, Or., 1976.

BRUSHLESS DOUBLY-FED MOTOR CONTROL SYSTEM

This invention was made with government support under Grant No. 79-85BP24332, awarded by the Bonneville Power Administration. The United States government has certain rights in this invention.

This application is a continuation of application Ser. No. 07/374,345, filed on Jun. 30, 1989, abandoned.

BACKGROUND OF THE INVENTION

This invention relates generally to alternating current (AC) variable speed drives and to methods of controlling variable speed drives, and more particularly to a drive system which utilizes a brushless doubly-fed electric motor which operates in both an induction mode and a synchronous mode. Such a brushless doubly-fed machine has a winding structure which differs from four other known types of electrical machines.

First, a synchronous machine typically has one set of polyphase power windings on a stator which are connected to a grid. The synchronous machine has DC (direct current) field or excitation rotor windings terminating at slip rings on the rotor. Via the slip rings, the excitation windings are connected by brushes to an external DC excitation source. Such brushes require periodic maintenance and replacement, which typically requires that the synchronous machine be disconnected from the power grid and the rotor brought to essentially a standstill. The brushes and slip rings also increase the electrical losses of the machine which detracts from the overall machine efficiency.

A synchronous machine is restricted to operation at a particular synchronous speed, and if torque requirements are exceeded the machine will lose synchronism, commonly referred to as "slipping a pole." After synchronism is lost, the system must be shut down and then brought back up to synchronous speed for resynchronization. Thus, a synchronous motor does not run at varying speeds unless the frequency of the stator windings of the machine is varied. To vary the stator winding frequency, a power electronic converter having the full power rating of the machine, must be added between the stator windings and the power grid. Since the converter must carry the full load current of the motor, the electrical losses and operating costs are increased, as well as the initial costs of the purchasing such a system.

Secondly, an induction machine also has polyphase power windings on a stator which are connected to a grid. The induction rotor may be either a wound rotor having rotor windings or a squirrel cage rotor having conducting bars embedded in slots on the rotor and interconnected at each end by conducting rings. An induced polyphase current circulates through the wound rotor windings or the squirrel cage rotor bars. A wound rotor induction machine suffers significant electrical losses if used in a drive system where the speed is changed by controlling the resistance of the wound rotor. The squirrel cage rotor induction machine requires a power electronic converter connected between the stator windings and the electric power grid to control the shaft speed. As described above for the synchronous motor, this converter must have the same rating as that of the induction motor, which increases the initial and operating costs of the induction drive. Moreover, accurate speed control of the induction motor also requires a tachometer feedback signal, as well as the associated control circuitry to interpret the speed feedback signal.

Thirdly, a hybrid electrical machine is a doubly-fed machine with brushes which has a stator with polyphase power stator windings connected to a grid. The hybrid doubly-fed machine has a wound rotor with polyphase excitation rotor windings terminating at slip rings. Via the slip rings, the rotor windings are connected by brushes to an external energy converter. This varies from the synchronous and induction machines discussed above, in that the energy converter varies the amplitude and frequency of AC rotor current or voltage to control the rotor speed and output characteristics of the doubly-fed machine. A controller monitors various system inputs and outputs, and according to a desired control strategy provides amplitude and frequency control signals to the energy converter. Such a doubly-fed motor is described in the inventor's United States patent entitled "Power Factor Motor control System," U.S. Pat. No. 4,982,147.

However, this hybrid doubly-fed machine requires brushes to transfer the excitation power from the energy converter to the polyphase rotor windings. The same disadvantages of brushes used on synchronous machines are also present in the hybrid doubly-fed machine, namely: maintenance and replacement costs including parts, labor and machine down-time; and decreased efficiency from the additional electrical loses imposed by the brushes and brush/slip ring interface.

Finally, a cascade induction motor for low speed operation was developed in the late 1800's. The original cascade machine was a two-frame machine comprising two wound rotor induction motors mechanically coupled together and coupled to the load. The primary motor slip power, that is the power extracted from the rotor windings of the primary motor, excites either the secondary motor stator windings or the rotor windings via slip rings and brushes. When the rotor of the secondary motor is excited, external resistances are added to the stator windings to control the speed. A rectifier-inverter returns the excess slip frequency power to the grid. By adjusting the inverter firing angle, the effective voltage and slip as seen from the secondary machine stator terminals is varied.

Brushless machines having two sets of polyphase stator systems with separate or shared common stator windings, and a squirrel cage rotor, have been studied and proposed by others in the past, particularly in the motor context. However, the extent of these studies has been to the use of the machine in a singly fed mode, that is, an induction mode. Any attempts at synchronous operation were limited to a single synchronous speed.

These prior studies and papers, discussed further below, are vague on the design aspects of the brushless machine, especially concerning the pole pitch of the windings. Generally, these machines had one set of stator windings connected to a power grid, and the other set of stator windings connected to a bank of variable resistors which were used to control the machine speed. The electrical losses produced by these resistors resulted in a very inefficient machine. Additionally, the use of the brushless machine in a singly fed or induction mode resulted in a poor power factor.

Power factor refers to the relative phases in the time domain of the waveforms of the polyphase AC voltage and current. For example, unity power factor is achieved when the waveforms of the polyphase AC voltage and current are in phase, that is, neither waveform is leading or lagging the other waveform. Operation at a poor power factor, such as a lagging or inductive power factor wherein the current waveform is lagging in time behind the voltage waveform, results in greater electrical losses within the machine, as well as on the lines feeding the machine, which detract from the overall machine efficiency.

Operation of a motor at a poor or lagging power factor incurs tangible economic costs. For example, in an industrial setting, such as a factory where many inherently inductive motors are used, a power company owning the grid which supplies the factory may impose additional charges for power consumed at a lagging (inductive) power factor. To avoid these charges, a factory may have to install expensive capacitor banks having an inherent leading power factor to correct the factory's power factor as seen from the grid.

The first discussion of which the inventor is aware of such a brushless motor having two sets of three phase stator systems with common windings appears in a 1907 article by Hunt. (J. L. Hunt, "A New Type of Induction Motor," *Proceedings of the IEE*, Vol. 39, pp. 648–667, 1907.) A new induction motor was proposed by Hunt to overcome the limitations of prior single frame cascade induction motor designs.

The motor described by Hunt has a stator with a single stator winding having terminals for connection to a grid. The stator windings are grouped in parallel circuits and have taps, but are otherwise of the ordinary type. The parallel circuits are shared by each of the two three phase systems. The taps are connected in pairs through resistances during starting or during rheostatic speed control, and the taps are short-circuited at normal speed. This varies from the start-up control of the torque and speed of a conventional slip ring motor wherein the resistances are connected to the rotor windings by the slip rings, and not to the stator windings.

The rotor of the Hunt motor has a short-circuited winding comprising shorted rotor bars. This provides a rotor which is mechanically simple and approximates the construction of a squirrel cage rotor which is commonly used in induction motors. If the rotor has no slip rings, that is, a brushless rotor, the motor runs at one efficient speed. The Hunt motor may operate at two, three or four efficient speeds by using slip rings and varying the number of rotor poles with an external switching means. Thus, the Hunt motor does not operate at any desired speed, but only at a few fixed speeds.

The Hunt article also discloses that if continuous or DC current is supplied to one set of stator windings and AC current to the other set, the motor will run at one single synchronous speed like a conventional synchronous motor. In this case, the machine is started from a standstill as an induction motor until normal speed is reached. At this point, the DC current is applied to one set of stator windings by closing a switch, and the motor pulls into step for operation at synchronous speed. The Hunt motor does not operate at variable speeds while operating in a synchronous mode.

In a 1921 article by Creedy, additional developments in multi-speed cascade induction motors were examined, including faster motors, and those having a greater number of discrete stepped speeds with smaller intervals between them. (F. Creedy, "Some Developments in Multi-Speed Cascade Induction Motors," *Proceedings of the IEE*, Vol. 59, pp. 511–532, 1921.) In a conventional manner, intermediate speeds between the discrete steps are obtained by adding resistance to the rotor windings across the slip rings. Such resistances, of course, detract from the overall machine efficiency by nonproductively consuming power and dissipating it as heat ($I^2R$ losses).

Basically, Creedy proposed a design method which removed some of the limitations of the Hunt design method. Creedy proposed two systems of stator windings, one having two poles and the other having six poles. In the discussion after the article, Hunt approves of the Creedy method and proposes using the two plus six pole stator winding configuration of Creedy with a brushless ("without slip-rings") rotor to obtain a commercial motor which runs at 750 rpm.

In a 1970 paper by Broadway and Burbridge, the rotor design of the Hunt induction motor was improved upon by producing a more efficient, robust, and economical squirrel-cage rotor. (A. R. W. Broadway and L. Burbridge, "Self-Cascaded Machine: A Low-Speed Motor or High-Frequency Brushless Alternator," *Proceedings of the IEE*, Vol. 117, No. 7, pp. 1277–1290, July 1970.) The Broadway/Burbridge machine is a self-cascaded single-frame unit which operates in a manner equivalent to a two-machine arrangement, where one machine would have two p-poles, and the other machine, two q-poles. The fields of each machine share a common magnetic circuit and the currents, which are normally separate, share the same windings. Each phase of the stator winding carries two component currents, each generally of a different frequency and flowing in different paths within the same winding. However, each phase winding in the rotor carries a single current of only one frequency.

The Broadway/Burbridge machine may run synchronously using resistance control, or synchronously without external rotor winding connections; that is, without slip rings or rotating diodes. For synchronous operation, the two q-pole components of the single-stator winding are energized with direct current. Broadway and Burbridge refer to this as being "doubly-fed," where a single stator winding receives both alternating (AC) current and direct (DC) current. The authors emphasize that "it is clearly desirable that no alternating current should flow in the direct-current supply, and vice versa." Thus, Broadway and Burbridge's use of the term, "doubly-fed" is quite different from that used herein to describe a preferred embodiment of the subject invention.

The Broadway/Burbridge rotor is a multicircuit single-layer winding with each slot containing only one conductor. A single rotor winding may be formed by a U-shaped conductor occupying two slots, with the ends of the U-shaped conductor short-circuited by a squirrel-cage end ring. Several such U-shaped windings of increasing size may be grouped concentrically in adjacent rotor slots. For example, the innermost U-shaped winding may have one slot between the legs of the U-shaped coil, and this central slot may be left unoccupied. Thus, the Broadway/Burbridge rotor is simple to construct and highly durable or robust.

To avoid an unbalanced magnetic pull which occurs when two fields differ by only two poles, Broadway and Burbridge state that it is "essential" that the two main fields differ by a minimum of four poles. The highest speed operation of this machine as a motor, and the lowest frequency output as an alternator, exist when the two fields are of six poles and two poles. For example, four such groups of concentric U-shaped windings may be used for a (6+2)-pole rotor winding.

In a 1978 article, Kusko and Somuah proposed speed control of a self-cascade single-frame brushless induction motor using a frequency converter comprising a DC-linked rectifier-inverter. (A. Kusko and C. B. Somuah, "Speed Control of a Single-Frame Cascade Induction Motor with Slip-Power Pump Back," *IEEE Transactions on Industrial Applications*, Vol. IA-14, No. 2, pp. 97-105, 1978.) The frequency converter provides slip recovery or slip-power pump back; that is, excess power not required at a particular speed is fed back into the grid which supplies power to the motor. This motor comprises two wound-rotor induction motors which are built on a common set of core laminations within a single motor frame. The rotor windings of these two motors are interconnected on the single rotor to form a self-cascade system. The rotor has no slip rings or brushes and each rotor winding is described as consisting of one squirrel-cage bar and two short-circuited single conductor coils.

The stator has two sets of stator windings. The primary stator winding has the greater number of poles, for example four, and is connected to the grid. The secondary stator winding has the lesser number of poles, such as two, and is connected to the solid-state rectifier-inverter. The synchronous speed of the motor is set by the sum of the pole pairs of the primary and secondary stator windings. Thus, synchronous operation occurs at a single synchronous speed.

The Kusko/Somuah motor achieves a speed variation by removing the excess power from the stator through the secondary windings and applying it to the rectifier-inverter of the frequency converter. The power as received by the rectifier-inverter is AC and appears in a variety of frequencies. The rectifier portion of the frequency converter rectifies this wild frequency AC power into DC power which travels through a DC link to the inverter. The inverter portion then converts the DC power into AC power at the grid frequency for supply back into the power grid. Thus, there is no real control of the motor, just a recovery of the surplus power not required by the motor. According to the authors, the maximum benefit of the slip-energy recovery system is only attained at low speeds.

Operation of the Kusko/Somuah motor above the synchronous speed requires replacement of the diode rectifier with a thyristor bridge or a cyclo converter. The authors suggest that the use of a cyclo converter in-drive may allow the "possibility" of power factor control. However, this concept is not developed further in any fashion by the authors.

The Kusko/Somuah motor suffers from several limitations. For example, the frequency converter must be sized to handle the slip power which is proportional to the maximum slip times the load torque. Such a large frequency converter increases the cost of the overall system. Also, only the wide-speed range drives are capable of being started with the frequency converter. However, these wide-speed range drives disadvantageously have a reduced power factor at part speed.

The Kusko/Somuah motor is unsuitable for driving varying mechanical loads. From an examination of the equations given by the authors, it is apparent that if the mechanical load driven by the motor varies, the speed of the motor will also vary. That is, such load variations will cause a shift in the torque-speed characteristic of the motor. Correction of this torque-speed characteristic requires injecting a voltage at the second set of stator three phase systems. Therefore, control of the Kusko/Somuah motor also requires a speed control feedback loop, which monitors the shaft speed and supplies firing control to the frequency converter. Finally, the slip power control method proposed by Kusko/Somuah does not control the power factor of the machine because the method operates the motor in the singly-fed mode. Thus, the Kusko/Somuah machine behaves like a conventional induction motor with an inherently lagging power factor.

Therefore, a need exists for a new drive system, controller and method of controlling a brushless doubly-fed motor driving a varying mechanical load which overcomes the limitations and disadvantages of the motors discussed above.

SUMMARY OF THE INVENTION

The drive system of the present invention includes a brushless doubly-fed electric motor which operates in both an induction mode and a synchronous mode. The drive system receives polyphase AC (alternating current) electric power from a grid and drives a varying mechanical load while operating substantially in a synchronous mode of operation at infinitely variable speeds over the entire speed range of the motor.

A brushless doubly-fed motor is a brushless doubly-fed electrical machine which receives electrical power from a power source, such as the grid, and converts this power into rotating mechanical energy to drive a load. The present invention involves a brushless doubly-fed machine that is a single-frame machine having a squirrel-cage rotor, resembling a conventional induction machine squirrel cage rotor, and a stator with stator windings comprising first and second polyphase stator systems. The first and second stator systems may be physically separate windings on the stator, or the first and second stator systems may share common windings. With common stator windings shared between the first and second stator systems, different currents or voltages having different frequencies are applied to the terminals of each stator system. For example, the first stator system serves as power windings which are connected to the grid, while the second stator system serves as excitation windings which are connected to a power electronic convertor in accordance with the present invention.

It is an overall object of the present invention to provide an AC variable speed drive system having improved operational characteristics, and particularly to provide a drive which uses a brushless doubly-fed motor.

Still another object of the present invention is to provide a variable speed drive having a brushless doubly-fed motor which operates in a synchronous mode over a large speed region.

An additional object of the present invention is to provide an AC variable speed drive having a converter and a brushless doubly-fed motor which is excited by the converter to drive a load irrespective of variations in the load.

An additional object of the present invention is to provide a variable speed drive having a power electronic converter and a brushless doubly-fed motor which is economical to manufacture and operate, and which requires minimal maintenance.

Yet another object of the present invention is to provide a variable speed drive having a brushless doubly-fed motor and a converter which excites the motor and which is a fraction of the motor rating.

Still another object of the present invention is to provide a variable speed drive having a power electronic converter and a brushless doubly-fed motor with a system of power stator windings and a system of excitation stator windings, wherein there are common shared stator windings between each of the systems, and wherein frequency separation of the power frequency and excitation frequency is provided at the terminals of each stator winding system.

Another object of the present invention is to provide a variable speed drive having a brushless doubly-fed motor which operates in both synchronous and induction modes at infinitely variable speeds.

Yet another object of the present invention is to provide a variable speed drive having a brushless doubly-fed motor which is stable in operation and immune to instability problems.

Still another object of the present invention is to provide a variable speed drive which is immune to synchronization pull-out problems which may occur upon sudden changes in the torque requirements of a load driven by the drive.

A further object of the present invention is to provide a method of controlling a motor driving a load at infinitely variable speeds between substantially zero speed and an upper speed limit while maintaining substantially synchronous operation at any such speed.

Still another object of the present invention is to provide a variable speed drive having a brushless doubly-fed motor, and an associated method of controlling the drive, to operate at a desired power factor irrespective of variations in a driven mechanical load.

An additional object of the present invention is to provide a frequency source excitation power generator for generating excitation power at a required frequency and amplitude to excite a brushless doubly-fed motor driving a load such that the motor maintains substantially synchronous operation at a speed and torque required to drive the load according to a desired motor operation strategy.

A further object of the present invention is to provide a variable speed drive controller for controlling a variable speed drive so the drive is responsive to changes in a driven mechanical load.

Yet another object of the present invention is to provide a variable speed drive controller which controls a converter of such a drive operating in a controllable current source mode, and to provide an alternate controller which controls a converter operating in a controllable voltage source mode.

Another object of the present invention is to control a brushless doubly-fed motor to secure operation at a desired power factor and speed without requiring a speed control feedback loop from the motor.

To achieve these objects, a method for controlling a motor at infinitely variable speeds, that is between substantially zero speed and an upper speed limit, is provided for maintaining substantially synchronous operation of the motor at any such speed. The method uses a motor having a brushless rotor unit with rotor windings and a stator unit with stator windings comprising first and second polyphase stator systems.

Power is applied to the first stator system from an electric power grid at a system frequency of the grid. In a monitoring step, a parameter of the power received by the motor from the electric power grid is monitored, and a power input signal is produced. In an establishing step, a reference signal is established according to a desired motor operation strategy. In a generating step, excitation power is generated at a controlled frequency and amplitude in response to the monitored power input signal and the established reference signal. In an injecting step, the excitation power is injected into the second stator system at the controlled frequency and amplitude.

In one embodiment, a method is provided of controlling a motor which periodically slips from synchronous operation when the torque requirements of the load exceed the driving torque of the motor. In addition to steps described above, this illustrated method further includes the steps of maintaining motor operation in an induction mode after the motor has slipped from synchronous operation, and pulling the motor into synchronous operation from the induction mode of operation. In the pulling step, excitation power is generated at the required frequency and amplitude for synchronous operation at the increased load torque.

In a further aspect of the present invention, a method is provided of controlling an AC variable speed drive driving a load. The drive has a converter and a brushless doubly-fed motor as described above, with the first stator system receiving power from an electric power grid at a system frequency of the grid.

A parameter of the power received by the drive from the grid is sensed and a power sensor signal corresponding to the sensed parameter is produced. In an establishing step, a reference signal is established according to a desired motor operation strategy. In a controlling step, the drive is controlled by processing the power sensor signal and the established reference signal and generating therefrom a controller signal. In a converting step, power is received from a converter power source and converted with the converter according to the controller signal to produce excitation power at an excitation frequency. In a feeding step, the converted excitation power is fed at the excitation frequency to the second stator system.

In another aspect of the present invention, an AC variable drive system is provided which receives power from an electric power grid at a system frequency of the grid and which drives a mechanical load. The drive system comprises a brushless doubly-fed motor which has a rotor with rotor windings and a stator with stator windings comprising first and second polyphase stator systems. The first stator system receives the power from the grid. Sensor means is provided for sensing a parameter of the power received by the drive from the grid and producing a power sensor signal corresponding to the sensed parameter. Reference means is provided for establishing a reference signal according to a desired motor operation strategy. Controller means is provided for receiving and processing the power sensor signal and the reference signal, and for generating therefrom a controller signal. Converter means is provided for receiving and converting power from a converter power source according to the controller signal to produce excitation power at an excitation frequency. The converter means is also provided for injecting the excitation power into the second stator system at the excitation frequency.

According to another aspect of the present invention, an AC variable speed drive is provided which receives power from an electric power grid at a system frequency of the grid and drives a mechanical load in response to a controller signal received from a controller. The drive comprises a brushless doubly-fed motor having a rotor with rotor windings and a stator with stator windings. The stator windings comprise first and second polyphase stator systems, with the first stator system receiving the power from the grid. The drive also includes converter means for receiving and converting power from a converter power source in response to the received controller signal. The converter means is also provided for producing excitation power at an excitation frequency, and for injecting the excitation power from the converter means into the second stator system. In this manner, the load is driven by the drive irrespective of variations in the load.

In another aspect of the present invention, an AC variable speed drive controller is provided for controlling an AC variable speed drive driving a load. The drive receives power from an electric power grid at a system frequency of the grid. The drive comprises a power electronic converter and a brushless doubly-fed motor, as described above. The controller comprises receiving means for receiving a power sensor signal produced by a power sensor which senses a parameter of the power received by the motor from the grid and produces the power sensor signal which corresponds to the sensed parameter. The controller also includes reference means for establishing a reference signal according to a desired motor operation strategy. The controller also includes processing means for processing the received power sensor signal and the reference signal and generating therefrom a controller signal. The controller signal is received by the power electronic converter which produces the excitation power at an excitation frequency in response the controller signal so as to drive the load according to the desired motor operation strategy irrespective of variations in the load, by controlling the excitation power received by the second stator system of the motor.

In yet another aspect of the present invention, a frequency source excitation power generator, or frequency generator, is provided for generating excitation power at a required frequency and amplitude to excite a brushless doubly-fed motor driving a load. The brushless doubly-fed motor may be as described above, with sensor means provided for sensing a parameter of the power received by the motor from an electric power grid and producing a power sensor signal corresponding to the sensed parameter. The frequency source excitation power generator includes controller means comprising reference means for establishing a reference signal in accordance with a desired motor operation strategy. The controller means is provided for receiving and processing the power sensor signal with the reference signal and for producing a controlled frequency and amplitude signal. The frequency generator further includes converter means for converting the power received from a converter power source into excitation power of variable frequency and amplitude. The converter means operates in response to the controlled frequency and amplitude signal. The converter means is also provided for injecting the excitation power into the second stator system, whereby substantially synchronous operation of the motor is maintained at a speed and torque required to drive a load according to the desired motor operation strategy.

Thus, the use of a brushless doubly-fed motor and a power electronic converter for a variable speed drive offers many attractive features and advantages. For example, the variable speed drive having a brushless doubly-fed motor of the present invention may be produced at a lower initial cost and it is a more durable unit requiring less maintenance which results in lower operating costs than other drives having other types of motors. These advantages are realized from several features, including the use of a brushless motor which is excited by a converter having a rating which is a fraction of the motor rating. Another desirable feature is the simplicity of the squirrel cage brushless rotor which may be more economically manufactured than a wound rotor.

The variable speed drive system of the present invention having a brushless doubly-fed motor, a converter and a controller, as well as the associated method for controlling the motor advantageously results in a variety of enhanced operational performance characteristics. For example, the motor may drive a load in both a synchronized and an induction mode of operation. If during synchronous operation the load torque should exceed that of the motor drive torque, loss of the synchronous mode of operation may result. In other conventional motors, such loss of synchronization would require the motor to be restarted. However, loss of synchronization in the present invention merely causes the motor to enter an induction mode of operation where the shaft speed is still controllable. Thus, the synchronous mode of operation with a backup operation in an induction mode efficiently controls the shaft speed irrespective of variations in the load.

These and other objects, features and advantages of the invention will become apparent to those skilled in the art from the following description and drawings.

DESCRIPTION OF THE PREFERRED EMBODIMENTS

In this description of preferred embodiments, the following characters or variables are defined as: I=current; V=voltage; E=induced voltage; R=resistance; X=inductance; Z=impedance; P=real or active power; Q=reactive power; T=torque; f=frequency; s=slip; n=number of pole pairs; RPM=shaft speed in revolutions per minute; rms=root mean squared value of a quantity.

The following variables and numbers are used as subscripts to indicate: 1=a first stator winding system quantity; 2=a second stator winding system quantity; a, b and c=respective 3-phases associated with a 3-phase power system; r=a rotor quantity; e=a Thevenin equivalent quantity; em=an electromechanical quantity; ag=an air-gap quantity; x and y=the respective horizontal and vertical ordinates of a graphed quantity.

A horizontal bar above a variable indicates a phasor quantity. An asterisk (*) indicates the conjugate of a value. Several other variables, subscripts and superscripts are defined in this detailed description when required.

The Variable Speed Drive

Figure 1:
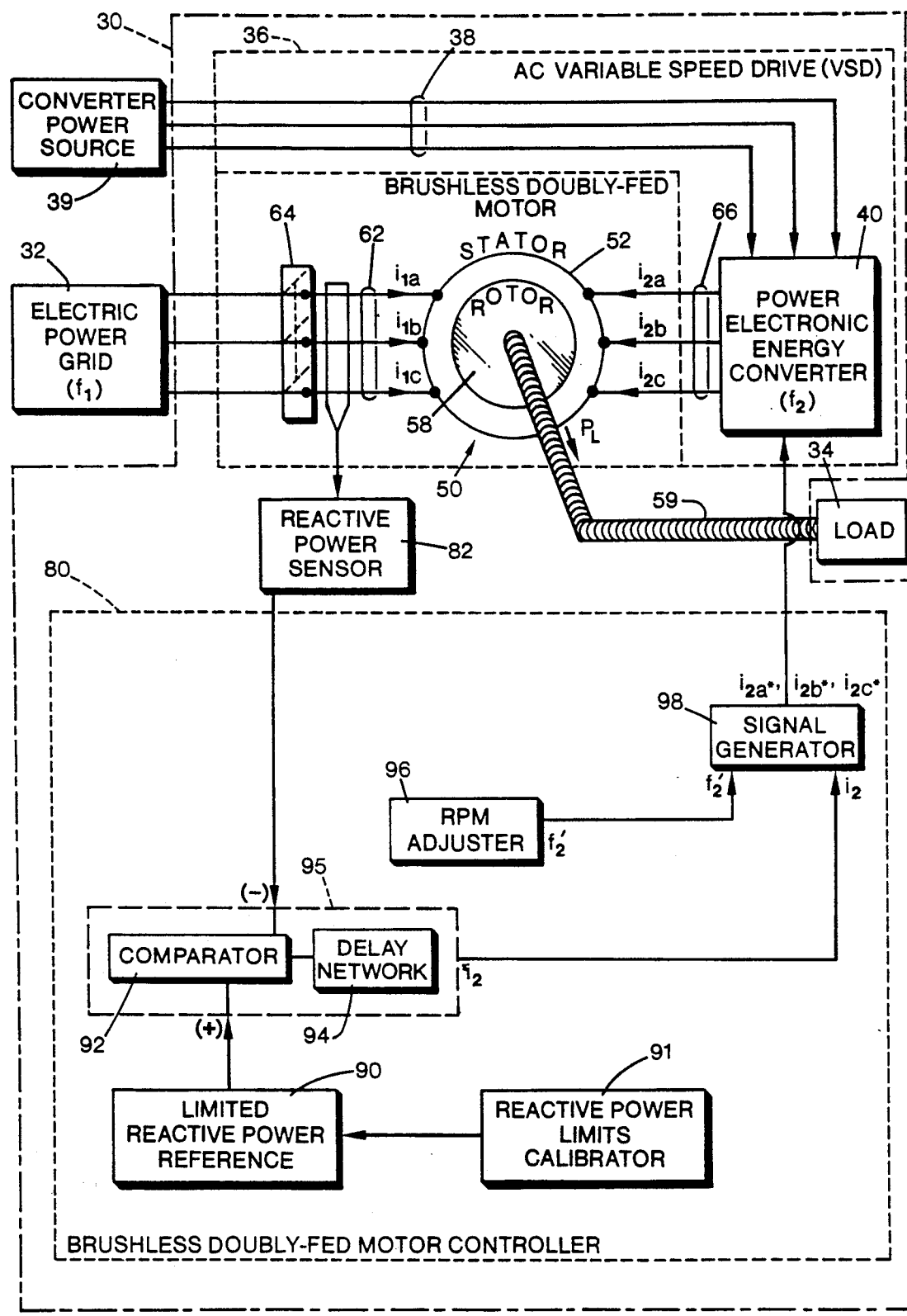
FIGS. 1, 2 and 3 are schematic block diagrams of alternate embodiments a variable speed drive system of the present invention including a brushless doubly-fed motor controller and an AC variable speed drive (VSD) having a brushless doubly-fed motor and a converter.
Figure 2:
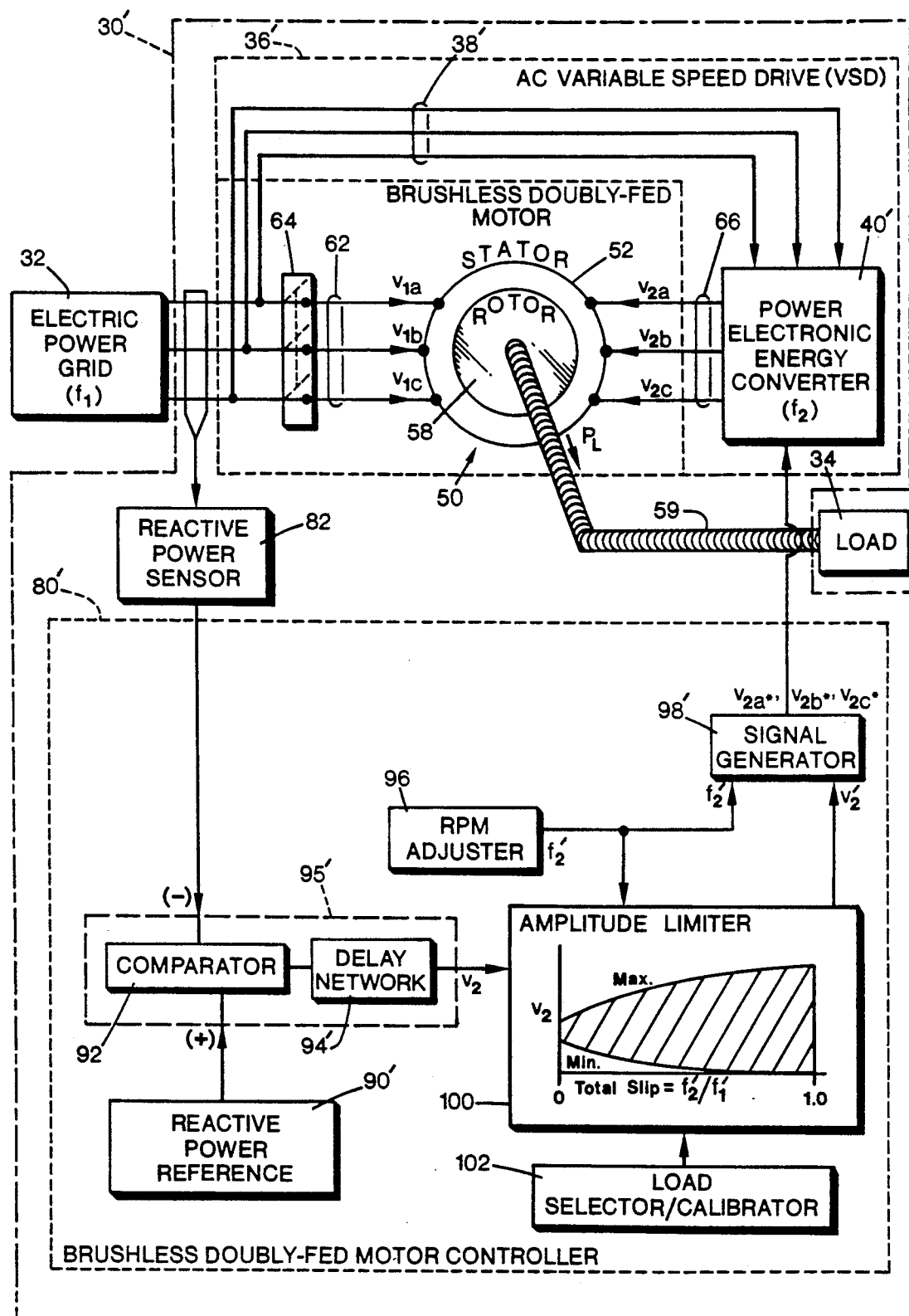
Figure 3:
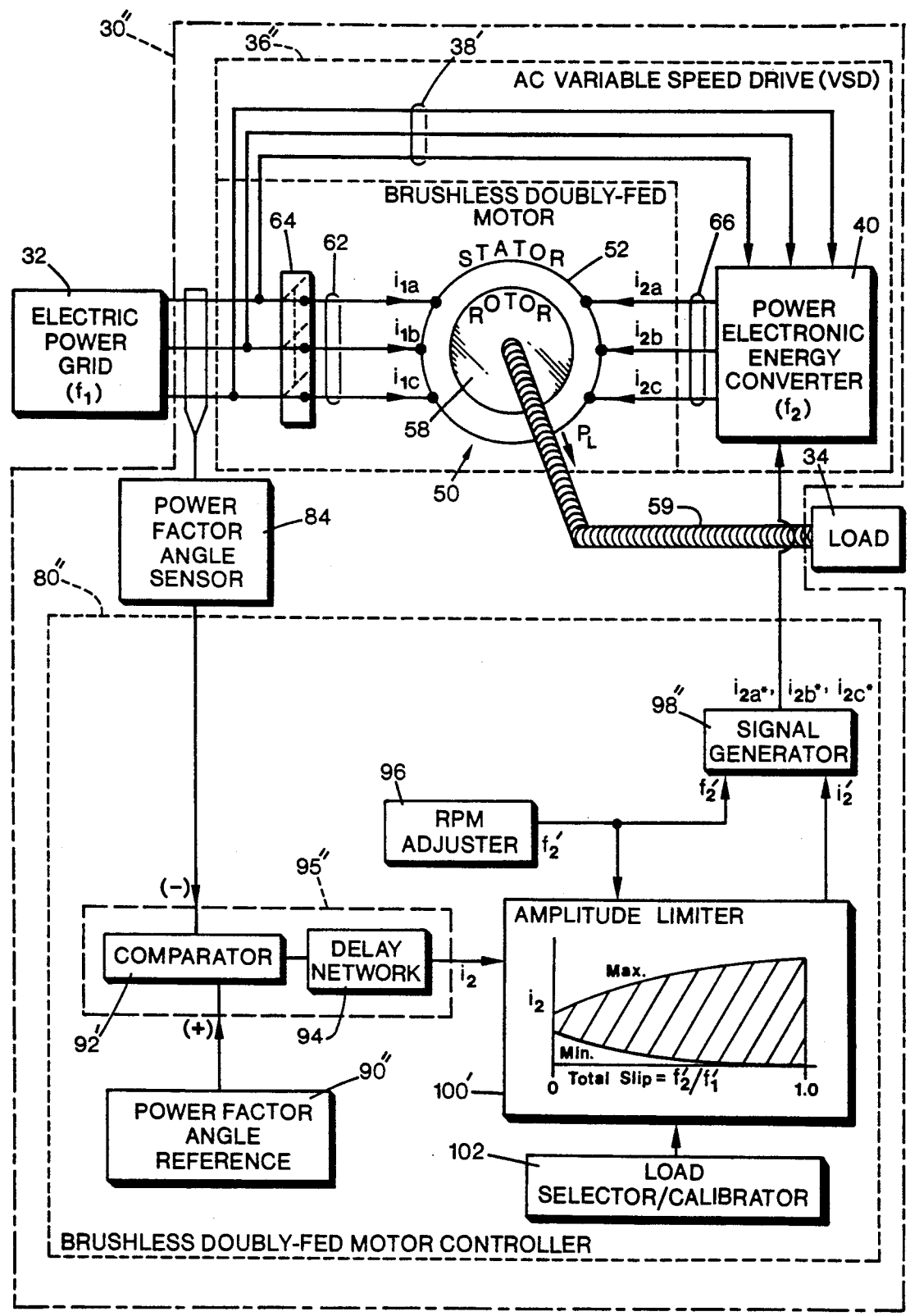

Referring to the illustrated method and embodiments of FIGS. 1, 2 and 3, three embodiments of an alternating current (AC) variable speed drive (VSD) system 30, 30' and 30" are shown. Each VSD system receives AC power from an electric power system or grid 32 having a system frequency $f_1$, and drives a mechanical load 34, such as a pump. The VSD systems 30, 30' and 30" each include a respective AC variable seed drive (VSD) 36, 36' and 36".

In FIG. 1, supply means, such as electric cables 38, supply power the from an external converter power source 39 which serves as a converter power source for converter means, such as a power electronic energy converter 40, of the drive 36. The external converter power source 39 be a separate generator, a direct current (DC) battery bank or the like. Alternatively, the cables 38 may supply power directly from the grid 32 to the converter (not shown), separate from the interconnection of the drive and the grid.

FIGS. 2 and 3 include tapping means, such as electric cables 38', for tapping a portion of the power applied to the drive 36 by the grid 32 to serve as the converter power source. The tapping means 38' may tap this portion of the applied power either internal or external to the drive.

The converter 40 receives and converts power from the converter power source to produce excitation power at an excitation frequency $f_2$ in response to a received controller signal, discussed in further detail below. The drives 36 and 36" of FIGS. 1 and 3 each have a converter 40 operating in a controllable current source mode, whereas the drive 36' of FIG. 2 illustrates a converter 40' operating in a controllable voltage source mode. (Hereinafter, unless either the VSD system or the drive of FIG. 1 is specifically referred to, the respective item numbers 30 and 36 generally refer to the VSD systems and variable speed drives of FIGS. 1, 2 and 3.)

In the current source mode, current amplitudes and frequencies are considered, whereas voltage amplitudes and frequencies are considered in the voltage source mode. Any such controllable type of energy conversion means or converter, such as a rotating exciter, may be used in the variable speed drive 36 of the present invention. However, a power electronic converter 40, 40' is illustrated for its high response speed and flexibility.

Figure 4:
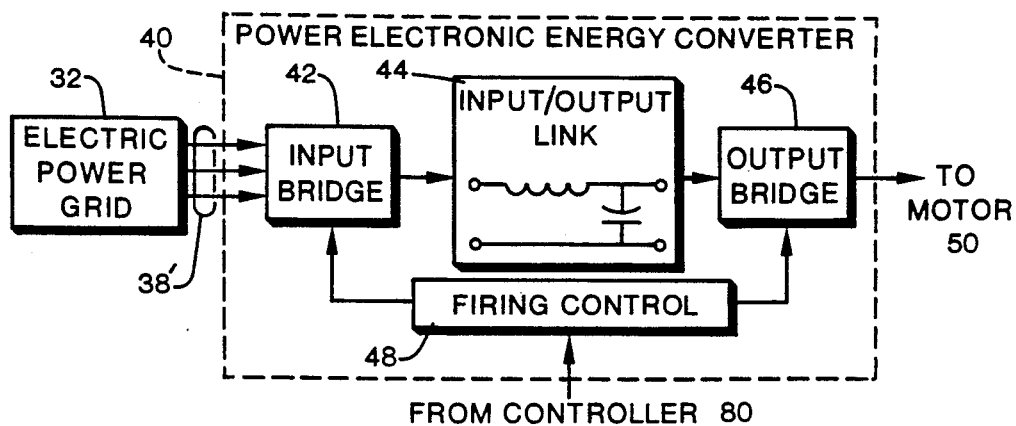
FIG. 4 is a schematic block diagram of one form of a converter of the present invention.

A variety of power electronic converters are commercially available, having the basic configuration of FIG. 4. The illustrated converter 40 includes an input bridge 42 which receives power from the converter power source, such as grid 32, and conditions this power for input to an input/output link 44. The input/output link 44 may be a DC filter comprising a series conductor and a parallel capacitor as shown in FIG. 4. The filtered output of link 44 is supplied to an output bridge 46 which further conditions the power for use by a motor 50, which is described further below.

The input and output bridges 42, 46 are comprised of semiconductors such as MOSFET's, silicon controlled rectifiers (SCR's), and diodes. Although the configurations of the semiconductors in the input and output bridges vary by manufacturer, the input bridge 42 is typically a full wave or a half wave rectifier, whereas the output bridge 46 is typically an inverter bridge. Transformers (not shown) may also be included within or external to the converter 40 to step-up or to step-down the voltage as required by the particular application.

The converter 40 also includes a firing control circuit 48 which controls the time at which the semiconductors of the input and output bridges 42, 46 trigger to conduct current. The firing control circuit 48 is responsive to the controller signal, discussed below. As mentioned above, the converter 40 may also be designed to accept an input of DC power, such as from a battery. Another example of a suitable converter is described in U.S. Pat. No. 4,096,557 to Schwarz.

Thus, the excitation frequency and amplitude of the converter excitation power output are determined by the interaction of the firing control circuit 48 and the output bridge 46. The excitation frequency may be varied from zero to several hundred Hertz or higher as required to vary the shaft speed. Increasing torque requirements of the load 34 are met by increasing the amplitude of the current, and thus the power, received from the grid 32, which increases the driving torque of motor 50.

Referring to FIGS. 1, 2, 3 and 5, the variable speed drive 36 includes a brushless doubly-fed motor 50 having a stator unit or stator, represented by the outer circle 52 of the motor (see FIGS. 1-3). The stator 52 has stator windings comprising first and second polyphase stator systems 54, 56 (see FIG. 5). The motor 50 also has a brushless rotor unit or rotor, represented by the inner circle 58 of the motor (see FIGS. 1-3). The rotor 58 has a shaft 59 and rotor windings 60. The shaft is coupled to and thereby drives the load 34.

The first stator system 54 receives power from the grid 32 via electrical conductors 62, illustrated for a 3-phase grid and motor. Although 3-phase VSD systems are illustrated, it is apparent that the motor 50 may be designed for implementation with systems having other numbers of phases, such as a 2-phase system.

Switching means, such as a breaker or switch 64, may be included in series with conductors 62. In FIG. 1, the switch 64 may be either internal or external to drive 36. For the embodiments of FIGS. 2 and 3, it is preferable to have switch 64 located to the motor side of the tapping means 38'. This arrangement allows power to flow from the grid to the converter when switch 64 is open, such as during start-up.

The converter 40, 40' includes means for injecting or feeding the excitation power into the second stator system 56, such as electrical conductors 66, also illustrated for a 3-phase application. Optional switching or breaker means (not shown) may be included in series with conductors 66, either internal or external to the converter 40, 40'.

In FIGS. 1 and 3, for the converter 40 operating in a controllable current source mode, the 3-phase inputs to the second stator system 56 are the currents $i_{2a}$, $i_{2b}$, and $i_{2c}$, whereas the 3-phase current inputs of the grid 32 to the first stator system 54 are shown as $i_{1a}$, $i_{1b}$ and $i_{1c}$. In FIG. 2, for the converter 40' operating in a controllable voltage source mode, the 3-phase inputs to the second stator system 56 are the voltages $v_{2a}$, $v_{2b}$, and $v_{2c}$, whereas the 3-phase grid 32 voltage inputs to the first stator system 54 are shown as $v_{1a}$, $v_{1b}$ and $v_{1c}$. In the following discussion, the converter 40 which operates in the controllable current source mode, will be illustrated.

Stator Design

Figure 6A:
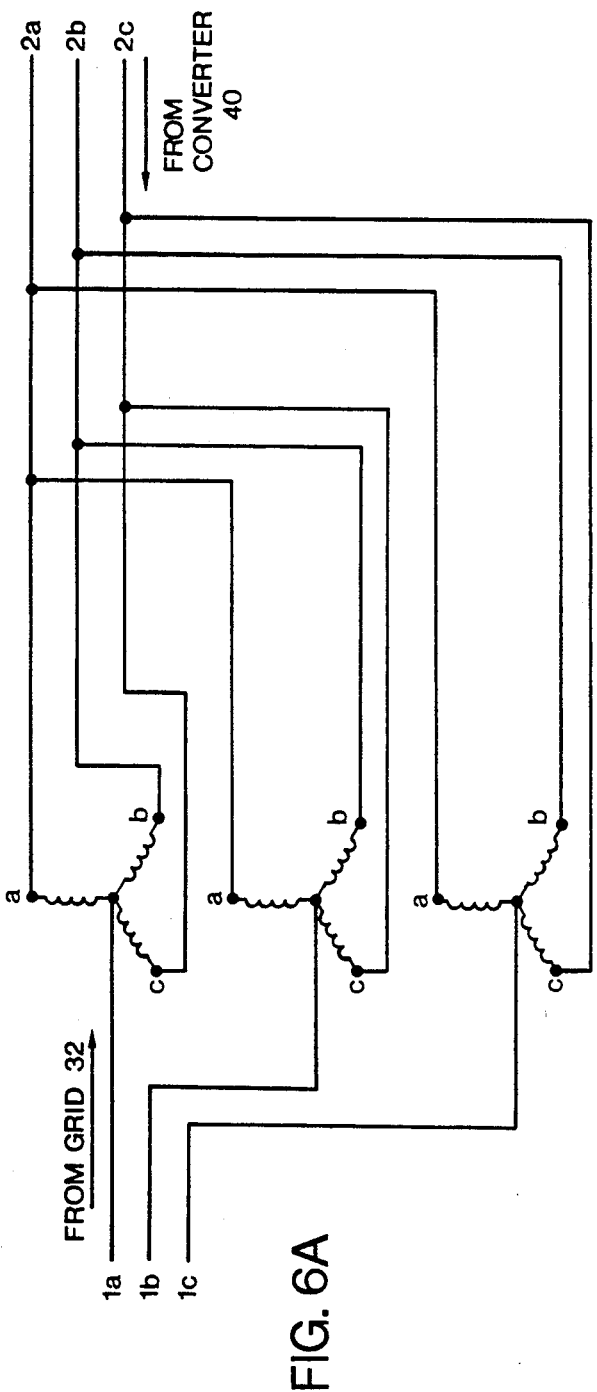
FIGS. 6A and 6B are schematic circuit diagrams of one form of the brushless doubly-fed machine of the present invention.

FIG. 6A is a schematic circuit diagram of the stator windings the illustrated 3-phase brushless doubly-fed motor 50 which receives power from grid 32 via inputs labelled 1a, 1b and 1c. The motor receives excitation power from converter 40 via inputs labelled 2a, 2b and 2c. Note that the inputs from the grid and converter could be in terms of current signals for converter 40 operating in a controllable current source mode (see FIGS. 1 and 3), or in terms of voltage signals for converter 40' operating in a controllable voltage source mode (see FIG. 2).

Figure 6B:
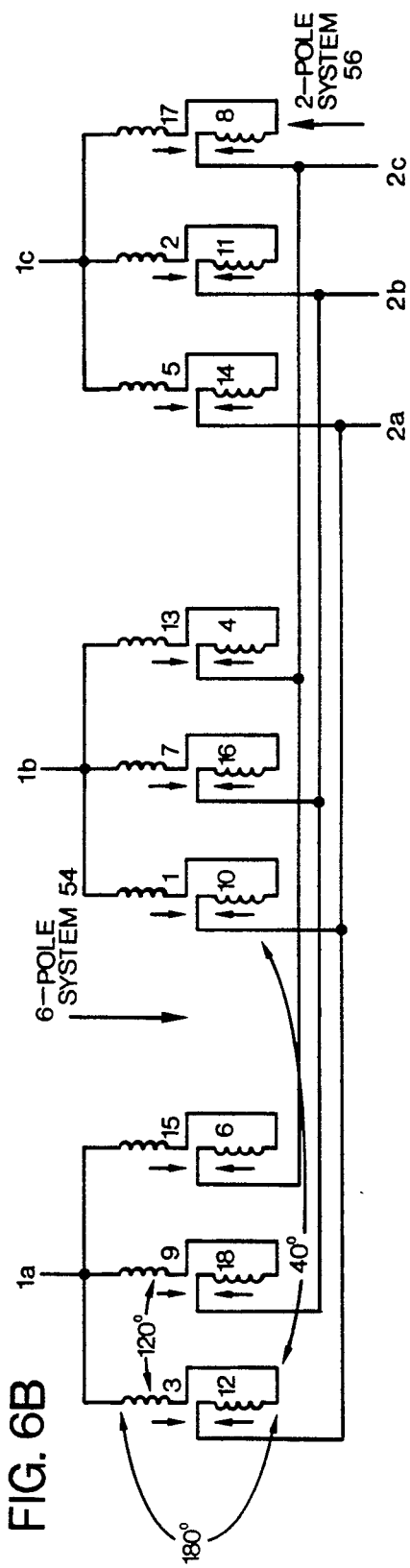

In FIG. 6B, the first stator system 54 of motor 50 comprises a 6-pole winding system which receives power from the grid 32, and the second stator system 56 comprises a 2-pole winding system which receives power from the converter 40. A "pole" refers to a magnetic pole of the electric machine, such as a north pole or a south pole, and a pole-pair comprises 2-poles. Thus, the first stator system 54 has three pole-pairs and the second stator system 56 has one pole-pair.

The number of poles for each stator system are chosen so that the first stator system 54 has at least four more poles than the second stator system 56. By having the difference between the number of poles be at least four, unbalanced magnetic pull conditions are avoided. Thus, an alternate embodiment may comprise first and second stator systems having eight poles and four poles, respectively. With the second stator system having the lesser number of poles, the torque distribution is lower on the converter side of the machine.

A lower torque distribution on the converter side of the machine advantageously allows the converter 40 to have a lower rating. A lower rated converter is more economical to manufacture because the components may also have lower ratings, that is, a lesser current-carrying capacity. This feature allows the AC variable speed drive system of the present invention to be economically attractive where previous variable speed systems were cost-prohibitive because the converter had to have the same rating as the motor.

FIGS. 6A and 6B illustrate the first and second stator systems 54, 56 as having common shared stator windings, with each coil of the stator windings carrying two current components, one from grid 32 and the other from converter 40. Generally, these two current components which flow within a given coil have different frequencies $f_1$ and $f_2$, and flow in the different paths of the same coil. Separating the frequencies of these two current components is accomplished by satisfying two conditions.

First, the stator windings are distributed in slots to eliminate mutual coupling between the two current components. This condition results from selecting a different number of poles for the first and second stator systems.

Second, the phase windings must be balanced, that is, of equal impedance to prevent the flow of neutral currents from one 3-phase system into the other 3-phase system. This is illustrated in FIGS. 6A and 6B as three parallel sets of 3-phase systems. The three arrows labelled 40, 120 and 180 degrees depict the spacial angle of the mutual magnetic coupling between the magnetic axes of the indicated coils. Such a balanced design also advantageously prevents other undesirable side effects, such as torque pulsations caused by negative sequence currents and unbalanced loading of the grid 32.

As required by the first condition above, FIG. 6B illustrates the slot distribution of the windings to prevent mutual coupling of the two current components and to separate the frequencies of the two current components. In arranging the stator windings within stator 52, the pole-pitch may correspond with either the 6-pole system or the 2-pole system. However, if the pole-pitch is chosen on the basis of the 2-pole system, the requirement of a high magnetizing current for the 2-pole system is avoided.

Thus, for the 2-pole system, the pole-pitch spans half of the total number of stator slots. For a 36-slot stator having eighteen coil sections and slots equally spaced about the inside of the stator 52, each coil section occupies two slots. In FIG. 6B, the relative position of each coil section about the inside of the stator is indicated by the numerals 1–18 adjacent each coil section. However, the pole-pitch may be shortened, referred to as "fractional pole-pitch," to reduce undesirable harmonic effects. Thus, for a stator having 36 slots, a fractional pole pitch may span 16 slots. To smooth the magnetomotive force (MMF) waveforms, a double layer winding structure may be used.

Other design considerations may be optimized in a conventional manner by concentrating on the 6-pole system, such as minimizing losses, within the constraints of the motor rating, the winding structure, and the available slot space. The 6-pole first stator system is connected to grid 32 in the same manner as a conventional winding arrangement of an ordinary 6-pole induction machine. There are a variety of ways in which the same coils could be interconnected to form the 2-pole second stator system connected to converter 40. However, the illustrated interconnection of these coils produces a maximum flux density for a given current.

Rotor Design

Although the rotor winding 60 may be of a wound rotor design, a squirrel-cage rotor having rotor bars 68 is preferred because it is robust and more economical to manufacture than a wound rotor. Such a squirrel-cage rotor may be designed on the basis of the following theory.

Assume that the first stator system 54 has $n_1$ pole pairs which produce a first rotating stator field rotating in a first direction, and the second stator system has $n_2$-pole pairs which produce a second rotating stator field which rotates in an opposite direction. For a squirrel-cage rotor having a number of bars 68 equal to K, the first rotating stator field produces a main slot harmonic h (relative to the rotor) of:

$$h = n_1 - K.$$

For a brushless doubly-fed machine having a negative main slot harmonic h, the harmonic field rotates in a direction opposite to that of the first rotating stator field.

In order to produce the rotating field required for the second stator system 56, which also rotates opposite to the first rotating stator field, the main slot harmonic h is equal to the negative number of pole pairs of the second stator system ($h = -n_2$). Solving for K, the number of squirrel-cage rotor bars 68 is the sum of the number of pole pairs for the first and second stator systems, that is:

$$K = n_1 + n_2.$$

To enhance the motor performance, the rotor may include more slots than the number K for the bars 68. Shorted coils 70 may be inserted in these surplus slots between the bars, with an equal number of shorted coils being positioned between any two adjacent bars 68. In this manner, rotor leakage reactance and undesirable harmonics are advantageously reduced.

Figure 7A:
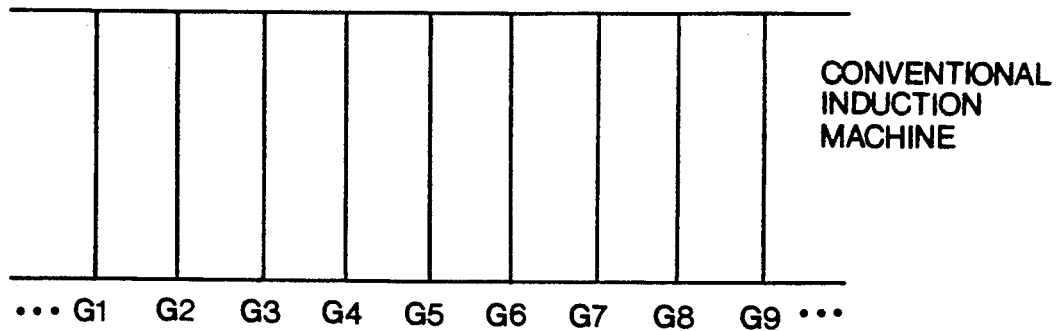
FIGS. 7A, 7B and 7C are schematic diagrams of a section of a squirrel cage rotor, with FIG. 7A illustrating a conventional induction machine rotor, and FIGS. 7B and 7C illustrating alternate embodiments for a brushless doubly-fed machine rotor of the present invention.
Figure 7B:
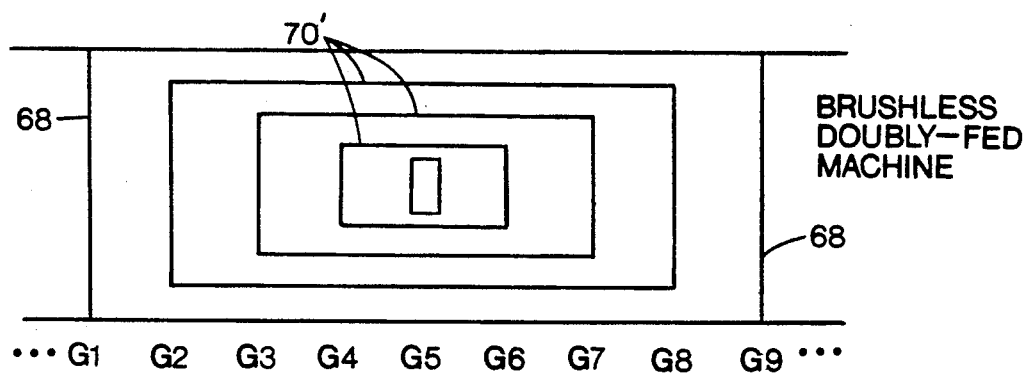
Figure 7C:
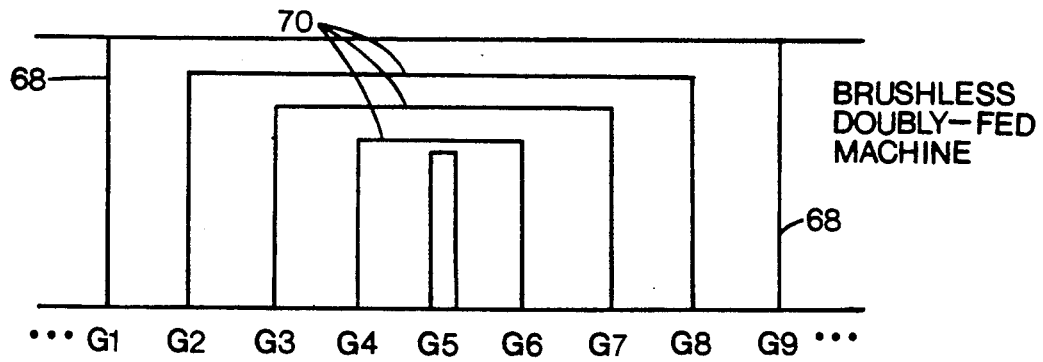

For reference, FIG. 7A shows one section of squirrel-cage rotor bars of a conventional induction motor. FIGS. 7B and 7C illustrate alternative embodiments of a section of a squirrel-cage rotor for the brushless doubly-fed machine of the present invention. In FIG. 7B, the slots numbered G1 and G9 are used for the rotor bars 68. Slots G2 through G8 may be filled with three shorted coils 70', with slot G5 left empty.

FIG. 7C illustrates a simplified version of the squirrel-cage rotor of FIG. 7B. This simplified rotor may be retrofit from a conventional induction motor squirrel-cage rotor (see FIG. 7A) by removing one of the end rings, and forming U-shaped coils 70 by shorting the appropriate rotor bars (that is, by shorting the bars in slots G2 and G8, G3 and G7, and G4 and G6, with G5 left unoccupied).

For the illustrated 6-pole and 2-pole stator systems having, respectively, three and one pole pairs, the number of rotor bars 68 is determined from:

$$K = n_1 + n_2 = 3 + 1 = 4 \text{ rotor bars.}$$

Figure 8:
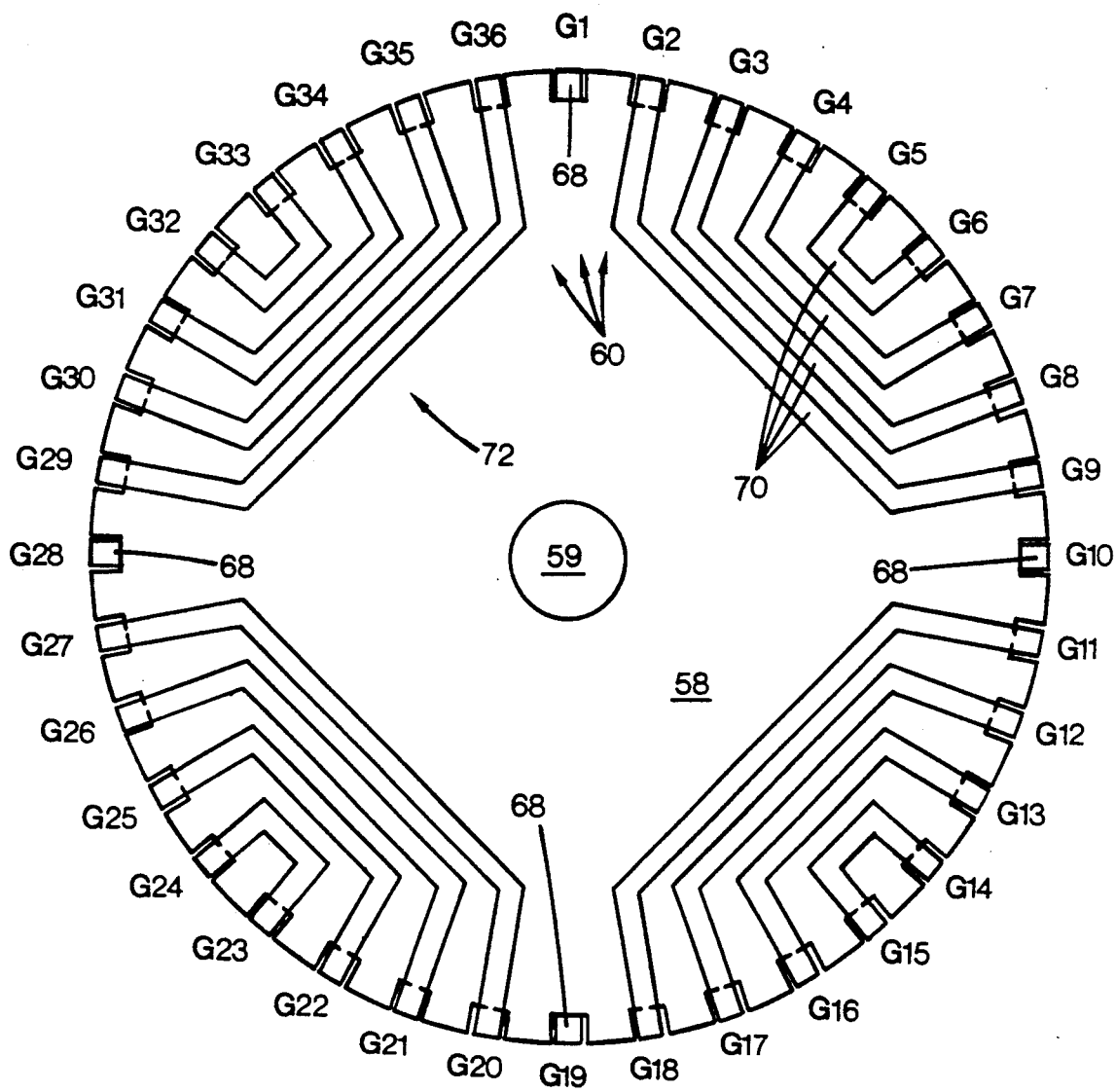
FIG. 8 is an unscaled end view of one form of a rotor of the brushless doubly-fed machine of the present invention.

Referring to FIG. 8, for example, for a 36-slot squirrel-cage rotor having sequentially numbered slots, the four rotor bars 68 are spread evenly over the rotor periphery, such as in slots numbered G1, G10, G19, and G28.

Groups of rotor windings 72 may be placed in the slots remaining between the rotor bars 68. For example, a rotor winding group 72 comprising four concentric shorted rotor coils 70 may be placed between any two bars, with no slot being left unoccupied. For example, between the bars in slots G1 and G10, the shorted rotor coils occupy slots: G2 and G9; G3 and G8; G4 and G7; and G5 and G6.

Modes of Machine Operation

As mentioned briefly above, the brushless doubly-fed machine operates in a synchronous mode and in an induction mode. Other earlier machines, discussed above in the background portion of this specification, operated only in a singly-fed mode. In the singly-fed mode, only one of the stator systems is connected to a frequency source which typically is an electric power grid. The second stator system is not connected to a frequency source, but rather to a passive network or to the rectifier side of a DC-link converter.

In this configuration, the machine operates exclusively in the induction mode. The current in the first stator system having a first frequency $f_1$ of the grid induces a rotor current having a rotor current frequency $f_{r1}$. The rotor current frequency $f_{r1}$ induces a current in the second stator system with a second frequency $f_{s2}$. Thus, the second stator system frequency $f_{s2}$ is imposed by the induction phenomenon, and not by an injected supply frequency.

The shaft speed or RPM of a singly-fed machine depends upon the matching of the machine's torque-speed characteristic with the torque-speed characteristic of the mechanical load.

In the doubly-fed mode of the present invention, the first and second stator systems 54, 56 are each connected to independent frequency sources, i.e., $f_1$ and $f_2$, which are each truly a supplied frequency. The 6-pole first stator system is connected to the power grid 32 which operates at a system frequency such as 60 Hz and, therefore, $f_1 = 60$ Hz. The 2-pole second stator system is connected to the converter 40 which supplies excitation power with a controllable frequency $f_2$. The doubly-fed induction and synchronous modes of operation for this embodiment are now discussed in greater detail.

(a) Doubly-Fed Induction Mode of Operation

Figure 5:
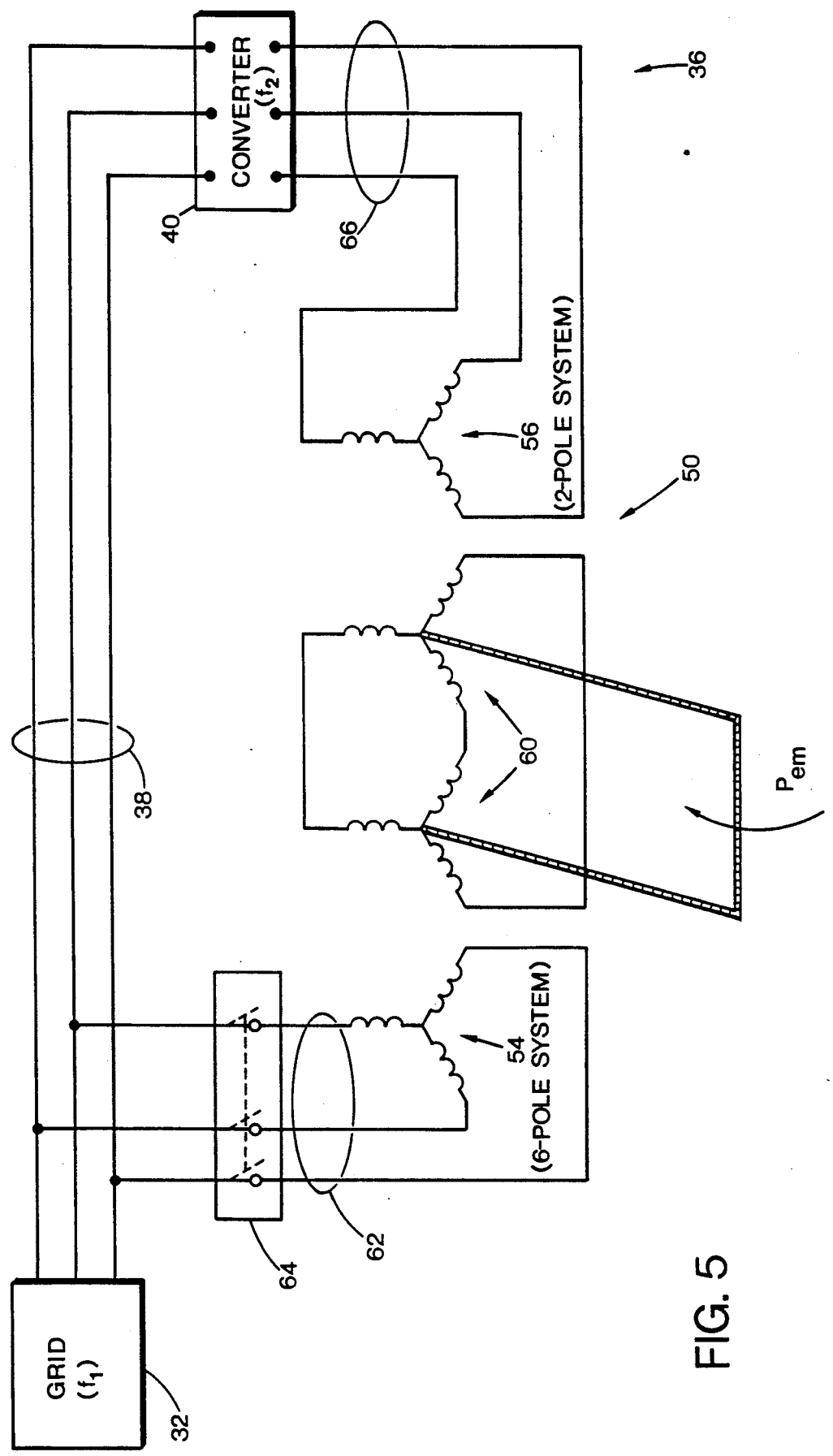
FIG. 5 is a schematic equivalent representation of a variable speed drive of the present invention.

Even though the doubly-fed machine of the present invention is constructed with common stator windings, as well as common rotor conductors, the machine performs in a manner equivalent to the system illustrated in FIG. 5. The equivalency of the machine in FIG. 5 is apparent from the frequency separation of the first and second stator systems which are not mutually coupled due to the stator winding arrangement discussed above (see FIG. 6B).

This equivalent representation of FIG. 5 depicts two conventional induction machines which share a common rotor winding and a common shaft. The stator of the first machine is connected to grid 32 and, thus, is designated as having the first stator system 54. The stator of the second machine is connected to the converter 40 and, thus, carries the second stator system 56. The rotor windings 60 of FIG. 5 are connected so that a single current flowing in the rotor conductors causes the rotational rotor fields of the 6-pole machine and the 2-pole machine to rotate in opposite directions.

For example, assuming the shaft rotation to be clockwise (CW) and the rotor rotational field associated with the 6-pole system to be clockwise, the rotor rotational field associated with the 2-pole system is counter-clockwise (CCW). Also assume a positive rotation of the 6-pole first stator system current to be in a clockwise direction and a positive rotation of the 2-pole second stator system current to be counter-clockwise.

A basic law of electromechanical energy conversion states that under steady-state operating conditions, the stator and rotor rotational fields must rotate at the same angular speed. Consequently, from the above assumptions and this basic steady-state operating condition law:

$$f_1 = n_1 f_m + f_{r1},$$
$$-f_2 = n_2 f_m - f_{r2},$$

with the shaft speed in RPM = $60 \times f_m$. In these relationships the symbols $f_1$ and $f_2$ are respectively the supply frequencies in Hertz to the stator 6-pole and stator 2-pole systems 54, 56; $f_m$ is the angular shaft speed in mechanical radians per second; $n_1$ and $n_2$ are the number of pole pairs and are respectively equal to 3 and 1; $f_{r2}$ and $f_{r2}$ are the frequencies of the rotor currents induced by the respective first and second stator systems 54, 56. Now, adding the above equations gives an explicit formula for the shaft speed according to:

$$RPM = 60 \times f_m$$

$$RPM = (60)[f_1 - f_2 - (f_{r1} - f_{r2})]/(n_1 + n_2)$$

From this equation, it is apparent that the shaft speed depends upon the mechanical loading characteristics. Since the supply frequencies $f_1$ and $f_2$ are fixed, the rotor frequencies $f_{r1}$ and $f_{r2}$ vary with changes in the mechanical loading. Given a mechanical loading torque-speed characteristic, stable operation at a certain shaft speed results when the machine matches the torque-speed characteristics of the load.

Figure 9:
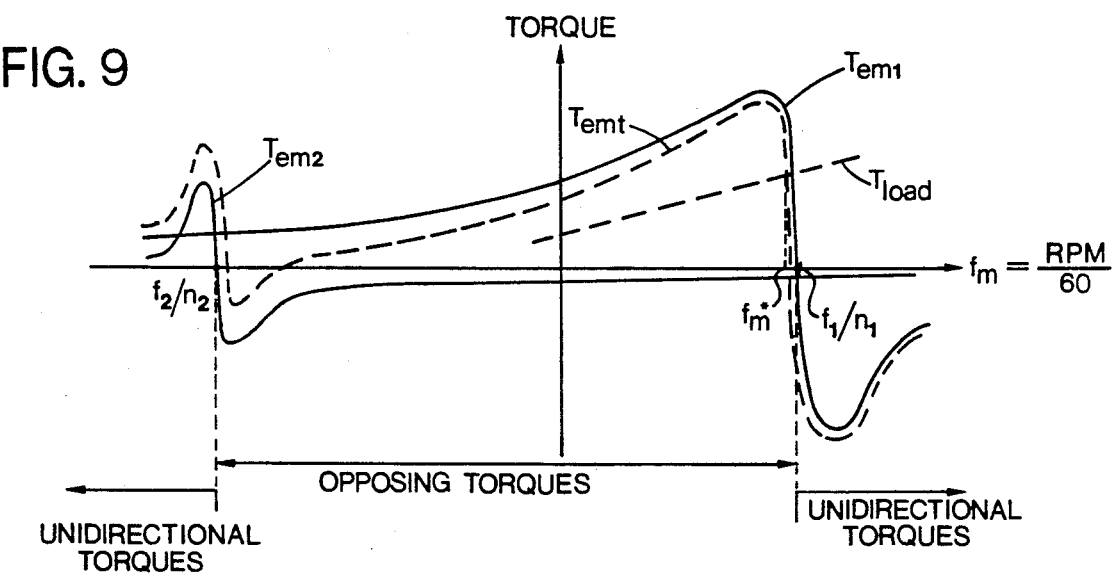
FIG. 9 is a graph of the torque-speed curves of a doubly-fed machine operated in an induction mode.

FIG. 9 illustrates this torque-speed matching for a brushless doubly-fed machine having the equivalent representation of FIG. 5. The total electromagnetic torque $T_{emt}$ of the brushless doubly-fed machine is the sum of the first and second stator system torque components, that is $T_{emt} = T_{em1} + T_{em2}$; where $T_{em1}$ is the 6-pole system torque having a synchronous frequency of $f_{em1} = f_1/n_1$, and $T_{em2}$ is the 2-pole system torque having a synchronous frequency $f_{ms2} = -f_2/n_2$. Note that the opposite signs of the two synchronous frequency values results from the opposite phase sequence of the supplies to the 6-pole and 2-pole systems.

Referring to the nonlinear speed-torque curves of FIG. 9, since the 6-pole stator system is connected to a fixed voltage source, i.e. the power grid 32, the $T_{em-1}$—speed curve is fixed. However, by controlling the converter 40 to vary either the amplitude or frequency $f_2$ of the excitation power, the shape of the $T_{em2}$—speed curve may be changed, resulting in a change of shape of the total electromagnetic torque curve $T_{emt}$. The actual shaft speed $f_m^*$ of the machine depends upon the location, of a point of intersection between the nonlinear torque-speed curves of the total electromagnet torque $T_{emt}$ of the motor and the load torque $T_{load}$.

Thus, the shaft speed of the doubly-fed machine operating in an induction mode depends upon the mechanical loading. Therefore, speed control in the induction mode requires a tachometer feedback (not shown) monitor the actual shaft speed. In this type of control scheme, the amplitude and/or frequency of the 2-pole system current may be varied to control the shaft speed to a desired value.

From FIG. 9, it is apparent that in the induction mode the machine has a speed region of opposing torques. In this region, the torque produced by the 6-pole system opposes the torque produced by the 2-pole system. Consequently, the torques in this region do not effectively counteract the load torque. Operation in this region detracts from the machine efficiency because unnecessary heat is accumulated in the rotor conductors.

(b) Doubly-Fed Synchronous Mode of Operation

In the doubly-fed synchronous mode of operation, under steady-state conditions the shaft speed is exclusively controlled by the frequencies supplied to the first and second stator systems 54 and 56, i.e. respectively $f_1$ and $f_2$. Under synchronous operating conditions, a single rotor current frequency prevails in the rotor, thus:

$$f_r = f_{r1} = f_{r2}.$$

This yields, as far as the relationships describing the angular speeds of the rotational fields are concerned, the following equations:

$$f_1 = n_1 f_m + f_r, \text{ and}$$
$$-f_2 = n_2 f_m - f_r.$$

From these equations, the shaft speed in the synchronous mode is:

$$RPM = 60 \times f_m,$$
$$= 60 \times \frac{f_1 - f_2}{n_1 + n_2}.$$

From the above equation, it is apparent that the shaft speed (RPM) is varied by controlling the excitation frequency $f_2$ produced by converter 40. In the synchronous mode of operation, the 6-pole and 2-pole system torques do not oppose one another as in the doubly-fed induction mode of operation. Thus, the machine efficiency is higher in the synchronous mode of operation.

The synchronism of the doubly-fed machine may be lost either by a severe disturbance (mechanical or electrical) or due to inappropriate amplitude values of the 2-pole current produced by converter 40. However, loss of synchronism does not result in a shut down of the machine from oscillatory behavior, but only results in the machine running in the induction mode of operation. The machine maintains stable operation with the shaft speed dependent upon the load characteristics.

Shaft Speed Control

Figure 10:
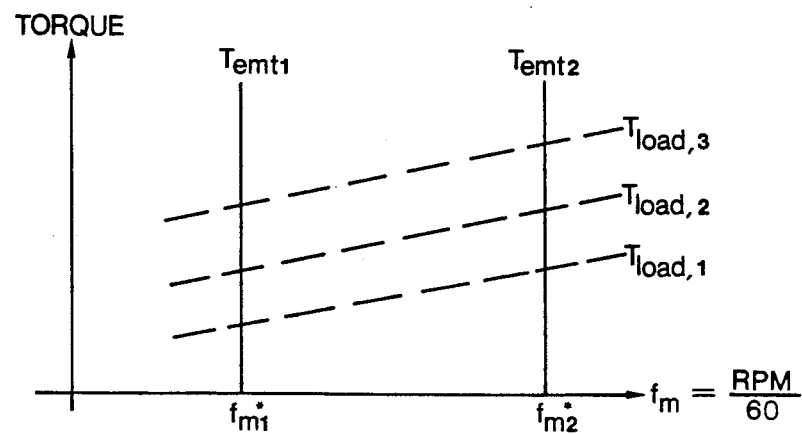
FIG. 10 is a graph of the torque-speed curves of a doubly-fed machine of the present invention operated in a synchronous mode.

Referring to the above equation and FIG. 10 for synchronous doubly-fed operation, it is apparent that the shaft speed may be changed by changing the waveform of the 2-pole current supplied by converter 40. The shaft speed may be continuously reduced under synchronous speed to zero RPM. Over-synchronous operation and reversed speed operation are also possible.

It is also apparent from the vertically linear torque-speed curves of FIG. 10 that the shaft speed of the brushless doubly-fed machine in the synchronous mode of operation is not sensitive to load variations. Rather the shaft speed is dependent only upon the frequency of the 2-pole current supplied by converter 40, provided that synchronous operation is maintained. This is accomplished by satisfying the 2-pole excitation current amplitude requirement, described further below under the heading "Requirements for Operation in the Synchronous Mode."

Synchronization

The synchronous mode of operation may be obtained by synchronization of the machine using one of three methods. That is, synchronization may be achieved at zero RPM, through the induction mode, or by DC synchronization. In either case, before synchronous operation can be initiated, there must be a match in the electrical characteristics at the machine terminals and the source (grid 32 and converter 40) terminals. The electrical characteristics that must match are the amplitude, frequency and phases of the voltages.

(a) Zero Speed Synchronization

Synchronization at zero RPM uses the switch 64 between the 6-pole first stator system 54 and the grid 32 (see FIG. 5). To prepare the machine for synchronization, the rotor 58 is blocked to prevent rotation with switch 64 open. While the rotor is blocked the rms value of the current of the 2-pole second stator system is raised by converter 40. This operation raises the voltage at the terminals of the 6-pole system.

The converter is adjusted until the frequency and rms voltage of the 6-pole first stator system is equal to the frequency and rms voltage of the power grid 32. When the voltage phases are also matched, the switch 64 is closed and the rotor blocking is released. The shaft speed is subsequently increased by the converter 40 by decreasing the frequency of current in the 2-pole second stator system 56.

(b) Synchronization from the Induction Mode

The second method of synchronization is through the induction mode. With the machine running in the induction mode, the converter 40 initially sets the frequency of the 2-pole system current to an arbitrary value. From this arbitrary value, the converter adjusts the amplitude of the 2-pole system current to obtain an RPM value which satisfies the equation: RPM=(60)[($f_1-f_2$)/($n_1+n_2$)] for synchronous operation. Further fine tuning by converter 40 of the frequency of the 2-pole current may be required to halt rotor slipping, after which the machine pulls into synchronism.

(c) DC Synchronization

The third method is DC synchronization, which is actually a special case of synchronization through the induction mode. Initially, the converter 40 is off and switch 64 is closed, allowing the machine to run at a speed dictated by the grid frequency and the number of pole pairs of the first stator system 54. That is, for a 60 Hertz grid and a 6-pole system, the initial machine speed is 1200 RPM.

To initiate synchronization, the converter 40 injects a DC current, i.e., at a frequency of zero Hertz, into the 2-pole system. The converter gradually increases the DC current amplitude which causes a decrease in the RPM of the machine until the machine locks into the synchronous speed. If the 2-pole DC current is increased beyond this value, the machine remains locked in the synchronous mode of operation.

However, there is an upper limit to the increase of the DC current, beyond which the synchronous mode of operation is lost. If synchronism is lost, system shut down is not required because the machine merely transcends into an induction mode of operation.

Brushless Doubly-Fed Machine Model

Before discussing the theory of operation of the brushless doubly-fed machine, a mathematical model of the machine is developed below. This model assumes only steady-state performance (no transients), balanced machine parameters, and neglects iron losses. For example, the stator windings are assumed to be sinusoidally distributed around the stator periphery. Also, the rotor bars are modelled as lumped inductances and resistances, that is they are slip dependent.

Figure 11:
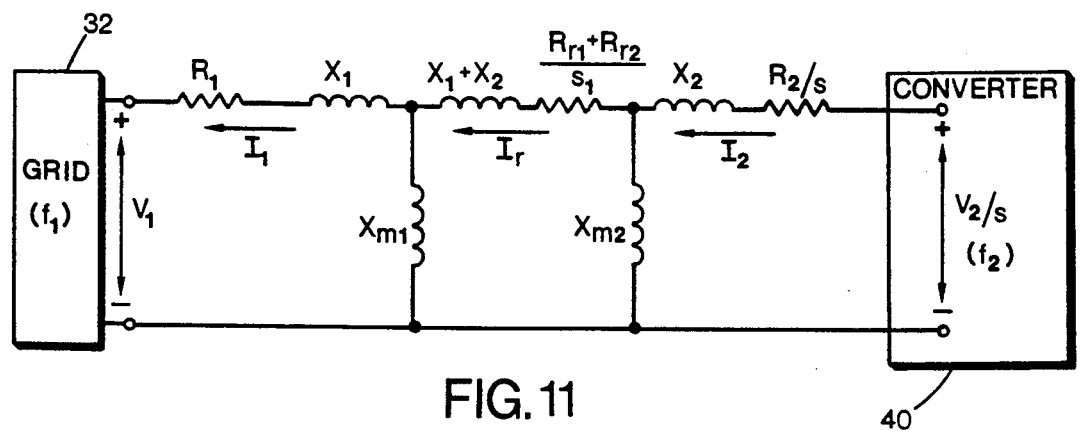
FIG. 11 is a single phase equivalent diagram model of the brushless doubly-fed machine of the present invention.

FIG. 11 is a single-phase equivalent diagram of a circuit model of a brushless doubly-fed machine having the equivalent representation of FIG. 5. In this model, the variables are defined with 6-pole system connected to the grid and 2-pole system to the converter, as:

$V_1$ = phase voltage of 6-pole system
$V_2$ = phase voltage of 2-pole system
$I_1$ = phase current of 6-pole system
$I_2$ = phase current of 2-pole system
$I_r$ = phase current of rotor
$R_1$ = stator resistance of 6-pole system
$X_1$ = leakage reactance of 6-pole system
$R_2$ = stator resistance of 2-pole system
$X_2$ = leakage reactance of 2-pole system
$R_{r1} + R_{r2}$ = total rotor resistance
$R_{m1}$ = 6-pole core loss resistance
$X_{m1}$ = main reactance of 6-pole system
$R_{m2}$ = 2-pole core loss resistance
$X_{m2}$ = main reactance of 2-pole system As mentioned above, the machine core or iron losses are neglected to facilitate analysis of the brushless doubly-fed machine. If included, the resistances $R_{m1}$ and $R_{m2}$ would be in parallel with the respective main reactances $X_{m1}$ and $X_{m2}$.

Since FIG. 11 is a single-phase equivalent diagram, all quantities are per-phase quantities, the voltages are line-to-neutral voltages and the currents are phase currents (conventionally taken as the "a" phase). In this model, the variables are referred to the stator windings of the 6-pole system side of the machine. The model illustrates the effect of the slip $s_1$ on the rotor resistance, and the effect of the total slip s on the stator resistance of the 2-pole system. This effect of the slip stems from the basic electromechanical law of conventional induction machine theory which requires the stator and rotor rotational fields to rotate at the same angular speed.

The interaction of the stator 6-pole system with the rotor, and the interaction of the rotor with the stator 2-pole system, allows the definitions of a 6-pole slip and a 2-pole slip to be, respectively:

6-pole slip = $s_1 = f_{r1}/f_1$, and 2-pole slip = $s_2 = f_{r2}/f_2$, with:

$f_{r1}$ = frequency of rotor current induced by the 6-pole system, $f_{r2}$ = frequency of rotor current induced by the 2-pole system, $f_1$ = supply frequency of the 6-pole system, and $f_2$ = supply frequency of the 2-pole system.

Since the above variables are referred to the stator windings of the 6-pole system side of the machine, the slip effect on the 2-pole system is a cascading of the slips $s_1$ and $s_2$. Thus, the 2-pole stator resistance is divided by the total slip. The total slip is defined as:

$$\text{Total slip} = s = (s_1)(s_2) = (f_2/f_1)(f_{r1}/f_{r2}).$$

As mentioned above, although the two rotor frequencies $f_{r1}$ and $f_{r2}$ are not required to be equal, these frequencies become equal in the synchronous doubly-fed mode. Thus:

$$f_r = f_{r1} = f_{r2},$$

$$s_1 = f_r/f_1,$$

$$s_2 = f_2/f_r, \text{ and}$$

$$s = f_2/f_1.$$

Substituting into these equations the angular speed rotational field relationships defined above, these relationships for the doubly-fed synchronous mode become:

$$s_1 = f_r/f_1 = [f_1 - (n_1)(f_m)]/f_1,$$

$$s_2 = f_2/f_r = f_2/[f_2 + (n_2)(f_m)], \text{ and}$$

$$s = (s_1)(s_2) = f_2/f_1 = [f_1 - (n_1 + n_2)(f_m)]/f_{s_1},$$

with:

$n_1 = 3$ = number of pole-pairs of 6-pole system,
$n_2 = 1$ = number of pole-pairs of 2-pole system,
$f_m$ = shaft-speed in mechanical radians per second,
$f_m$ = RPM/60.

From this, the shaft speed in mechanical radians per second in the synchronous doubly-fed mode is expressed as:

$$f_m = (1-s)f_1/(n_1+n_2) = (f_1-f_2)/(n_1+n_2),$$

with: Revolutions per minute = RPM = $60 \times f_m$.

A mathematical model based on the equivalent circuit of FIG. 11 has the usual voltage equations around the three meshes of the circuit and the current relations are determined from the two internal nodes of the circuit. From these equations, the power balance between the mechanical input power, the 6-pole power, the 2-pole power, and the two air-gap powers associated with the 2-pole and 6-pole systems is determined. The electromagnetic torques produced by the 2-pole and 6-pole systems are the respective air-gap powers divided by the shaft speed in radians per second.

A Theory of the Synchronous Mode of Operation

A theory of the synchronous mode of operation is developed below using the brushless doubly-fed machine circuit model of FIG. 11. This theory includes mathematical equations for the voltage-current relationships and the power balance. The distribution of the power and torques between the first and second stator systems 54, 56 is understood from the power balance of the brushless doubly-fed machine. After presenting the theory of the performance and characteristics of the brushless doubly-fed machine, a control system for operating the machine will be discussed.

(a) Voltage-Current Relationships

Each of the first and second stator systems 54, 56 induces a voltage on the rotor conductors, and the rotor conductors in turn induce a voltage on each of the first and second stator systems. From the brushless doubly-fed machine circuit model of FIG. 11, these induced voltages are defined as:

Induced voltage on 6-pole stator =

$$\bar{E}_{r1} = +jX_{m1}\bar{I}_r;$$

Induced voltage due to 6-pole current =

$$\bar{E}_1 = -jX_{m1}\bar{I}_1; \text{ and}$$

Induced voltage on 2-pole stator =

$$\bar{E}_{r2} = -jX_{m2}\bar{I}_r; \text{ and}$$

Induced voltage due to 2-pole current =

$$\bar{E}_2 = +jX_{m2}\bar{I}_2.$$

Using the above definitions of induced voltage in applying Kirchoff's voltage law to the three meshes or loops of the circuit model in FIG. 11, the voltage-current relationships for the 6-pole stator current, the 2-pole stator current, and the rotor circuit are respectively:

$$\bar{V}_1 = -\bar{I}_1 R_1 - j\bar{I}_1(X_1 + X_{m1}) + \bar{E}_{r1},$$

$$\bar{V}_2/s = +(\bar{I}_2)(R_2/s) + (j\bar{I}_2)(X_2 + X_{m2}) + \bar{E}_{r2}, \text{ and}$$

$$\bar{E}_1 = -(\bar{I}_r/s_1)(R_{r1} + R_{r2}) - (j\bar{I}_r)(X_1 + X_{m1} + X_2 + X_{m2}) + \bar{E}_2.$$

(b) Power Balance

Figure 12:
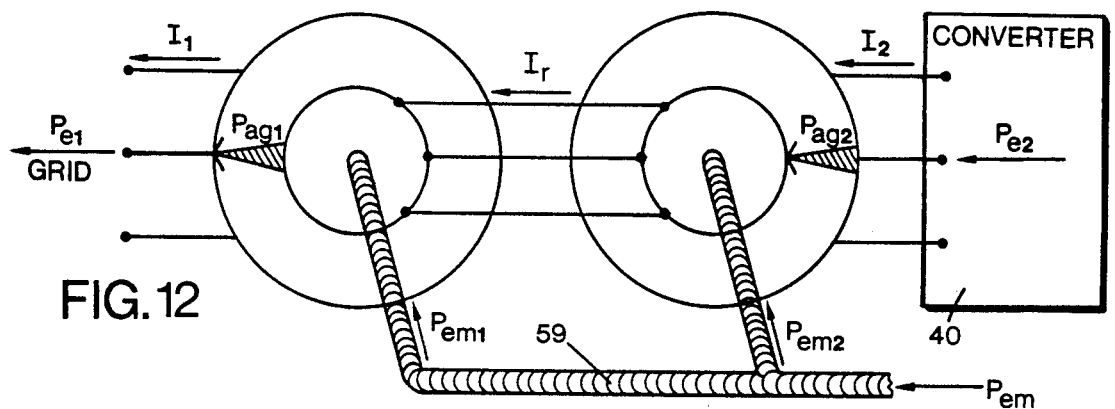
FIG. 12 is a diagram illustrating the power flow in the equivalent brushless doubly-fed machine of FIG. 4, illustrated according to generator convention, that is with a mechanical power input to the rotor.

From the brushless doubly-fed machine equivalent representation shown in FIG. 5, the power flow in the equivalent machine is illustrated in FIG. 12, according to generator convention. That is, the positive direction of power flow corresponds with operation of the brushless doubly-fed machine as a generator. Thus, from the following discussion, an operation of the brushless doubly-fed machine as a motor may be obtained by changing the sign conventions to correspond with a motor operation.

The symbols used in FIG. 12 are defined as:

$P_{em}$ = electromechanical power, i.e. the net power supplied to the machine's shaft and to be converted into electric power;

$P_{em1}$ = portion of $P_{em}$ converted to electric power by the 6-pole system;

$P_{em2}$ = portion of $P_{em}$ converted to electric power by the 2-pole system;

$P_{ag1}$ = air-gap power, abstract electric power transferred across the air-gap to 6-pole stator windings by the rotor conductors;

$P_{ag2}$ = air-gap power, abstract electric power transferred across the air-gap to rotor conductors by the 2-pole stator windings;

$P_{e1}$ = active power generated by the 6-pole stator windings into grid; and $P_{e2}$ = active power supplied to the 2-pole stator windings by converter.

The power balance of the brushless doubly-fed machine involving the above quantities of power is obtained from the voltage-current relationships above. By multiplying the voltage equation for the 6-pole system by the conjugated 6-pole current $\bar{I}_1^*$ yields the following:

$$\bar{V}_1\bar{I}_1^* = -I_1^2 R_1 - jI_1^2(X_1 + X_{m1}) + \bar{E}_{r1}\bar{I}_1^*.$$

To convert the above single-phase equivalent equation into a 3-phase representation, all the terms to the right and left of the equal sign are multiplied by three. By taking the real part ($R_e$) of the result, a power relationship for the 6-pole stator circuit is found according to:

$$P_{e1} = -3I_1^2 R_1 + P_{ag1},$$

with:

$P_{e1} = 3R_e\{\bar{V}_1\bar{I}_1^*\} = 3V_1 I_1 \cos(\phi_1)$,
$3I_1^2 R_1$ = power dissipated by 6-pole stator, and
$P_{ag1} = 3R_e\{\bar{E}_{r1}\bar{I}_1^*\}$.

The same strategy is applied to obtain the power relationships for the 2-pole stator system and the rotor circuit. Thus, the power relationship for the 2-pole stator circuit is:

$$P_{e2} = +3I_2^2 R_2 + s_2 P_{ag2},$$

with:

$P_{e2} = 3R_e\{\bar{V}_2\bar{I}_2^*\} = 3V_2 I_2 \cos(\phi_2)$,
$3I_2^2 R_2$ = power dissipated by 2-pole stator, and
$P_{ag2} = 3(s_1)R_e\{\bar{E}_{r2}\bar{I}_1^*\}$.

Power relationship associated with the rotor circuit:

$$s_1 P_{ag2} = P_{ag2} - 3I_r^2 R_{r1} - 3I_r^2 R_{r2},$$

with:

$P_{ag1}$ and $P_{ag2}$ defined above, and
$3I_r^2(R_{r1} + R_{r2})$ = power dissipated by the rotor winding conductors.

The above power relationships for the 2-pole and 6-pole stator circuits and for the rotor circuit relate different portions of the electrical power with the two air-gap powers $P_{ag1}$ and $P_{ag2}$. The electromechanical power may also be related to these air-gap powers. The total electromechanical power $P_{em}$ for generator convention operation of the doubly-fed machine, may be considered as supplying a portion to the 6-pole system and another portion to the 2-pole system. Thus, $$P_{em} = P_{em1} + P_{em2}.$$

Since the air-gap power and the electromechanical power of the 6-pole system are both related to the electromagnetic torque $T_{em1}$ produced by the 6-pole system, the following relationships exist:

$$P_{ag1} = (T_{em1})(2\pi f_1)/n_1, \text{ and}$$

$$P_{em1} = (T_{em1})(2\pi f_m).$$

From the above equations and the equation for the 6-pole slip $s_1$, it follows that:

$$f_m = (1 - s_1)f_1/n_1.$$

By substituting this relationship for $f_m$ into the above equation for $P_{em1}$ and by equating $T_{em1}$ and the above equations, the following results:

$$P_{em1} = (1 - s_1)P_{ag1}.$$

Using the same strategy for the 2-pole system with the torque produced by the 2-pole system $T_{em2}$, the following results are obtained:

$$P_{ag2} = (T_{em2})(2\pi f_r)/n_2,$$

$$P_{em2} = (T_{em2})(2\pi f_m),$$

$$f_m = (1 - s_2)(f_r/n_2), \text{ and}$$

$$P_{em2} = (1 - s_2)P_{ag2}.$$

Figure 13:
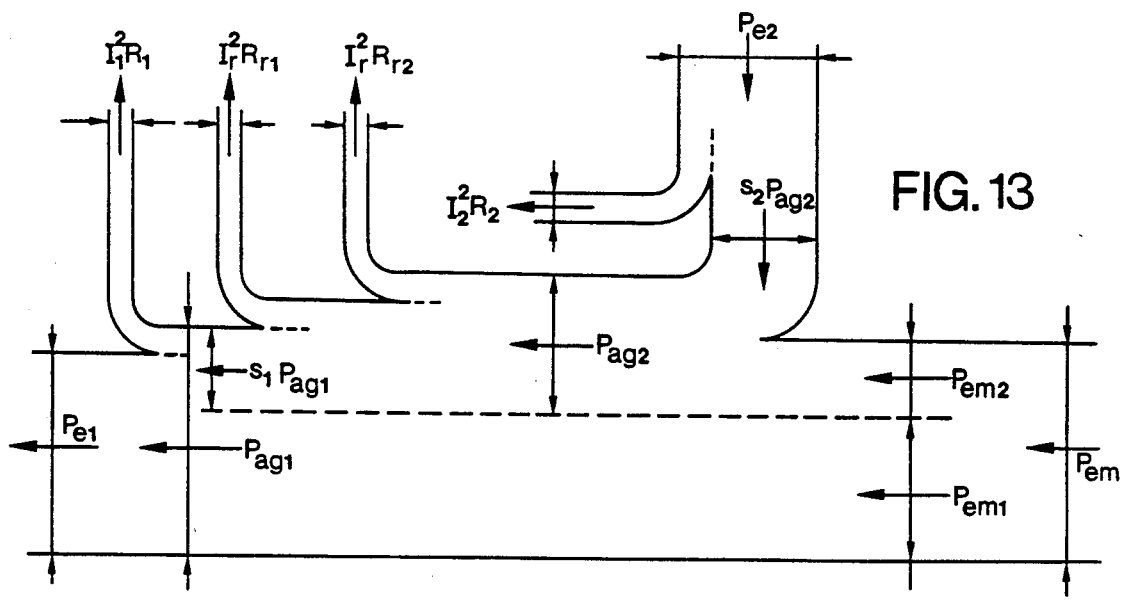
FIG. 13 is a diagram illustrating the power balance of a brushless doubly-fed machine of the present invention, with power flow illustrated according to generator convention.

These power balance relationships are illustrated in FIG. 13 for the brushless doubly-fed machine, according to generator convention. If the dissipation or heat losses ($I^2R$ losses) are minimized in the machine design to the point where they may be discarded, then a number of important conclusions may be drawn from the derived power balance relations.

(1) Torque Distributions

From the above equations, the distribution of the torques due to the 2-pole system and the 6-pole system may be established. The ratio of these two torques is:

$$P_{em2}/P_{em1} = T_{em2}/T_{em1} = [(1 - s_2)(P_{ag2})]/[(1 - s_1)(P_{ag1})].$$

If the heat losses ($I^2R$ losses) are neglected, then from the power balance relationships of FIG. 13 it follows that: $P_{ag2} = s_1 P_{ag1}$. Using this relationship, the air-gap power may be eliminated from the above equation. Therefore:

$$P_{em2}/P_{em1} = T_{em2}/T_{em1} = [(1 - s_2)(s_1)]/(1 - s_1).$$

By substitution for $(1 - s_1)$ and $(1 - s_2)$, and using the definition for the 6-pole slip $s_1$, the torque distribution is:

$$P_{em2}/P_{em1} = T_{em2}/T_{em1} = n_2/n_1.$$

With $n_1 = 3$ and $n_2 = 1$ representing the pole-pairs of, respectively, the 6-pole system and the 2-pole system, it is apparent that the power converted by the 6-pole system is three times as high as that converted by the 2-pole system. Thus, the 6-pole first stator system 54 is connected to the grid 32 to handle the bulk of the brushless doubly-fed machine power.

(2) Excitation Requirements

The active excitation power required by the brushless doubly-fed machine $P_{e2}$ is supplied to the 2-pole second stator system 56 of the machine. This active excitation power can be found from the power balance relations of FIG. 13. Disregarding the $I^2R$ losses, it follows that:

$$P_{e2} = s_2 P_{ag2} = s_2 s_1 P_{ag1} = s P_{ag1} = s P_{e1}.$$

Moreover, since:

$$P_{em} = P_{em1} + P_{em2}$$
$$= (1-s_1)P_{ag1} + (1-s_2)P_{ag2}$$
$$= P_{ag1} - s_1 P_{ag1} + P_{ag2} - s_2 P_{ag2}$$
$$= P_{ag1} - s_2 P_{ag2} \text{ (since } s_1 P_{ag1} = P_{ag2})$$
$$P_{em} = P_{e1} - P_{e2}.$$

By combining the above two groups of equations, the excitation power provided by converter 40 is determined as:

$$P_{e2} = sP_{e1} = [s/(1-s)](P_{em}),$$

with the slip s defined as:

$$s = f_2/f_2 = [f_1 - (n_1+n_2)(f_m)]/f_1, \text{ and}$$

$$f_m = RPM/60.$$

From this, the required rating of the converter 40 may be determined. It is desirable to limit the converter rating while maintaining a speed range from zero RPM up to 20% beyond the synchronous speed. Such a converter maintains a high input power factor when the converter load power factor deteriorates (i.e., the second stator system 56). The power factor of the second stator system as seen from the converter 40, decreases with an increase in a shaft speed above synchronous speed.

Circle Diagram

A circle diagram is an analytic tool used to design a control strategy for the brushless doubly-fed machine operated in a synchronous mode. Basically, a circle diagram graphically reflects the steady-state operating conditions of the brushless doubly-fed machine. At any particular operating point on the circle diagram, the operating characteristics of the machine are known: the active and reactive power passing between the machine 50 and the grid 32, the rms value and phase angle of both the stator and rotor phase currents, the power factor, the electromagnetic torque produced, or the air-gap power and the torque angle. From the circle diagram, the stability of the various operating points may also be predicted, as well as a desirable region of operation.

Figure 14:
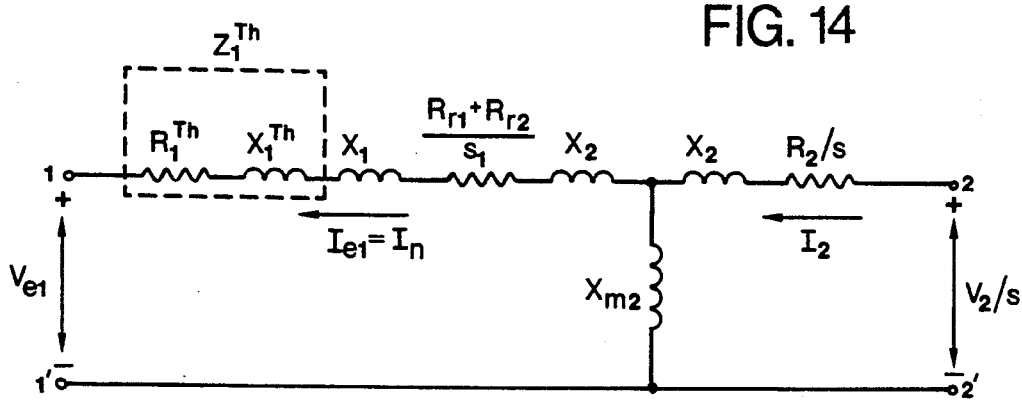
FIG. 14 is a single phase equivalent diagram of a Thevenin equivalent model of the brushless doubly-fed machine of FIG. 9.

Prior to constructing a circle diagram, the brushless doubly-fed machine's single-phase circuit model of FIG. 11 is simplified using Thevenin's theorem. A Thevenin equivalent of a 6-pole system is obtained by eliminating the branch containing $X_{m1}$ (the main inductance due to the magnetic coupling between the 6-pole system and the rotor). The resulting circuit is shown in FIG. 14. The system variables relating to the 2-pole second stator system 56 are the same, to illustrate the control exercised by the converter 40 over the brushless doubly-fed machine. The Thevenin resistance, reactance and equivalent 6-pole voltage are respectively $R_1^{Th}$, $X_1^{Th}$ and $\overline{V}_{e1}$, are defined as:

$$R_1^{Th} = (R_1 X_{m1}^2)/([R_1^2 + (X_{m1}+X_1)^2],$$

$$X_1^{Th} = [X_{m1}(R_1^2 + X_1^2 + X_{m1}X_1)]/[R_1^2 + (X_{m1}+X_1)^2],$$

$$\overline{V}_{e1} = c^{Th}\overline{V}_1,$$

with: $c^{Th} = (jX_{m1})/[R_1 + j(X_{m1}+X_1)]$.

The phase and amplitude of the equivalent 6-pole voltage $\overline{V}_{e1}$ are not equal to the phase and amplitude of the original 6-pole voltage $\overline{V}_1$. However, by inspecting the last of the above equations and realizing that $R_1 << (X_{m1}+X_1)$, it is apparent that the phase shift is negligible. By neglecting the phase shift, it follows that:

$$c^{Th} = (X_{m1})/(X_{m1}+X_1).$$

Moreover, since by design the leakage reactance $X_1$ is much, much less than the main inductance $X_{m1}$, it apparent that $\overline{V}_{e1}$ and $\overline{V}_1$ are practically equal.

The Thevenin equivalence should also preserve the power balance relationships of the brushless doubly-fed machine. Therefore, the equivalent 6-pole current $\overline{I}_{e1}$ is related to the actual 6-pole current according to:

$$\overline{I}_{e1} = \overline{I}_r = \overline{I}_1/c^{Th}.$$

Figure 15:
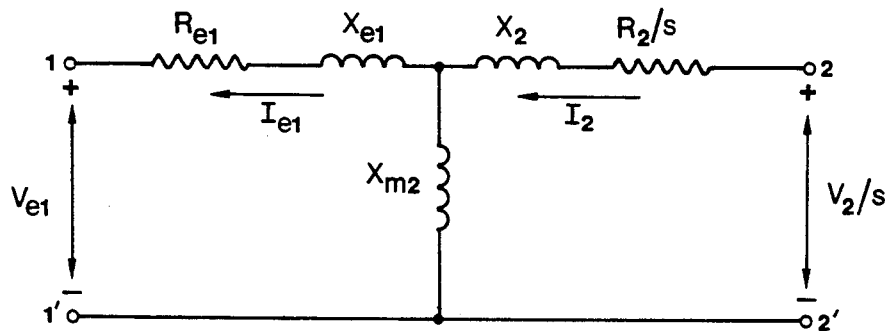
FIG. 15 is a single phase equivalent diagram of a simplified Thevenin equivalent model of the brushless doubly-fed machine of FIG. 9.

From the equations above, the circuit of FIG. 14 may be simplified as shown in FIG. 15, where the equivalent 6-pole resistance $R_{e1}$ and equivalent 6-pole leakage reactance $X_{e1}$ are given by:

$$R_{e1} = R_1^{Th} + [(R_{r1}+R_{r2})/(s_1)], \text{ and}$$

$$X_{e1} = X_1^{Th} + X_{r1} + X_{r2}.$$

The voltage-current relationships of the 6-pole first and 2-pole second stator circuits and the rotor circuit are:

$$\overline{V}_{e1} = -\overline{I}_{e1}R_{e1} - j\overline{I}_{e1}(X_{e1}+X_{m2}) + \overline{E}_2,$$

$$\overline{V}_2/s = +\overline{I}_2(R_2/s) + j\overline{I}_2(X_2+X_{m2}) + \overline{E}_{r2},$$

with $\overline{E}_2$ and $\overline{E}_{r2}$ defined as:

$$\overline{E}_2 = +jX_{m2}\overline{I}_2, \text{ and}$$

$$\overline{E}_{r2} = -jX_{m2}\overline{I}_r = -jX_{m2}\overline{I}_{e1}.$$

Having constructed a simplified model of a brushless doubly-fed machine, the circle diagram will be described in greater detail, referring to FIGS. 16, 17 and 18. Each point of the circle diagram represents a steady-state operating condition. Trajectories of these operating points are circles if certain variables are held constant. These circles are:

(a) circles of constant 6-pole current,
(b) circles of constant 2-pole current, and
(c) circles of constant air-gap power or electromagnetic torque.

Each of these circles will be discussed below before discussing the practical significance of these circle diagrams.

(1) Circles of Constant 6-Pole Current For the First Stator System (54)

Figure 16:
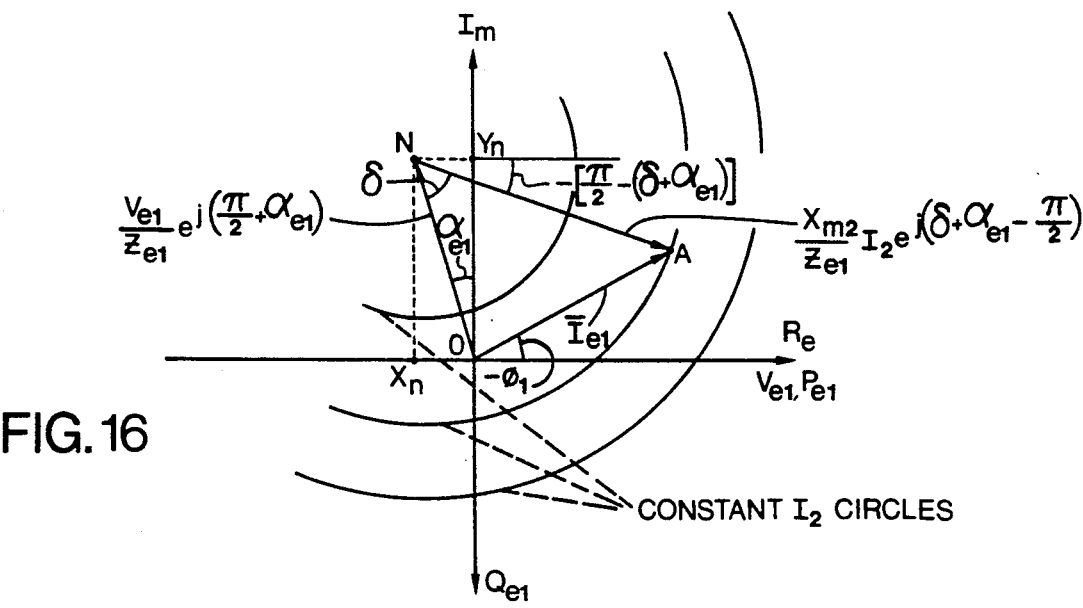
FIGS. 16, 17, 18 and 19 are circle diagrams illustrating various operating modes of the brushless doubly-fed machine of the present invention.

Referring to FIG. 16, the Thevenin equivalent voltage at the terminals of the 6-pole first stator system $\overline{V}_{e1}$ (see FIG. 15) is located on the horizontal axis, extending to the right of the origin. Thus, this voltage phasor has a phase angle of zero. The 6-pole equivalent current phasor $\overline{I}_{e1}$ extends from the origin to an operating point A. Given the location of an operating point, the power factor, active power and reactive power for the operating point are found from the circle diagram.

The power factor angle $\phi$ is the negative value of the angle between the 6-pole current phasor $\bar{I}_{e1}$ and the 6-pole voltage phasor $\bar{V}_{e1}$. The active power at the 6-pole terminals is:

$$P_{e1} = V_{e1} I_{e1} \cos(\phi).$$

Also from the circle diagram, the reactive power is equal to:

$$Q_{e1} = V_{e1} I_{e1} \sin(\phi).$$

(2) Circle of Constant 2-Pole Current of the Second Stator System (56)

From the equation above which defined the Thevenin equivalent voltage $\bar{V}_{e1}$, the Thevenin equivalent 6-pole current $\bar{I}_{e1}$ is derived as:

$$\bar{I}_{e1} = (V_{e1}/Z_{e1}) \exp[j(\alpha_{e1} + \pi/2)] + (X_{m2}/Z_{e1}) \bar{I}_2 \exp[j(\alpha_{e1} + \delta - \pi/2)]$$

with: phase angle of $\bar{V}_{e1}$ equal to zero,
$\delta$ = phase angle of $\bar{E}_2$, with $\bar{E}_2 = jX_{m2}\bar{I}_2$,
$Z_{e1} = [R_{e1}^2 + (X_{e1} + X_{m2})^2]^{\frac{1}{2}}$, and
$\alpha_{e1} = \arctan[(X_{e1} + X_{m2})/R_{e1}]$.

The variables $Z_{e1}$ and $\alpha_{e1}$ are respectively the magnitude and angle of the synchronous impedance of the equivalent 6-pole system. The balance of the terms are defined above with reference to FIG. 15. The terms defining the phasor $\bar{I}_{e1}$ are plotted on the circle diagram of FIG. 16. The 2-pole current phasor $\bar{I}_2$ is multiplied by a constant equal to $X_{m2}/Z_{e1}$, and is the arrow extending from a point n to the operating point A. Thus, a trajectory of operating points with a constant rms value of the 2-pole current $\bar{I}_2$ is a circle having a center at point N. The ordinates of point N are found from the equation for $\bar{I}_{e1}$ as:

$$x_N = (V_{e1}/Z_{e1}) \sin(\alpha_{e1}), \text{ and}$$

$$y_N = (V_{e1}/Z_{e1}) \cos(\alpha_{e1}).$$

Thus, concentric circles representing a constant rms value of the 2-pole second stator system current $\bar{I}_2$ are shown in FIG. 16 as having a common center at point N.

(3) Circles of Constant Air-Gap Power or Electromagnetic Torque

The brushless doubly-fed machine air-gap power $P_{ag}$ is related to the electromagnetic torque $T_{em}$ by a constant and is defined by:

$$P_{ag} = T_{em}[2\pi f_1/(n_1 + n_2)]$$

with:
$f_1$ = supply frequency of the 6-pole system,
$n_1 = 3$ pole pairs for the 6-pole system, and
$n_2 = 1$ pole pairs for the 2-pole system.

The electromagnetic torque $T_{em}$ is the total electromagnetic torque produced by the brushless doubly-fed machine. A relationship between the air-gap power $P_{ag}$ and the electromechanical power $P_{em}$ is derived as:

$$P_{em} = (T_{em})(2\pi f_m)$$

$$P_{em} = (T_{em})(2\pi)[(1-s)f_1/(n_1 + n_2)]$$

$$P_{em} = (1-s)P_{ag}.$$

From the load characteristics for a motor, the value of $P_{em}$ is known. At a given RPM or speed, the slip s is known, and thus, from these known values the air-gap power $P_{ag}$ is found from the above equation. This air-gap power is for the Thevenin equivalent model of the brushless doubly-fed machine shown in FIG. 15.

To determine the constant air-gap power circles of operating points which also represent a constant electromagnetic torque, the power balance of the brushless doubly-fed machine of FIG. 15 is analyzed. From the definition of the Thevenin equivalent voltage at the terminals of the 6-pole system, $\bar{V}_{e1}$, the active power balance is found by multiplying each side of the equation with $3\bar{I}_{e1}^*$ (three times the conjugate of the Thevenin equivalent current through the 6-pole stator system) and subsequently taking the real part of the resulting equation. Thus:

$$3 \text{ Real}\{\bar{V}_{e1} \bar{I}_{e1}^*\} = -3R_{e1} I_{e1}^2 + P_{ag},$$

with: $P_{ag} = 3 \text{ Real}\{jX_{m2}\bar{I}_2\bar{I}_{e1}^*\}$.

Since the power factor angle $\phi$ is the angle between the voltage phasor $\bar{V}_{e1}$ and the current phasor $\bar{I}_{e1}$, it follows that:

$$3V_{e1}I_{e1}\cos(\phi) = -3R_{e1} I_{e1}^2 + P_{ag}.$$

Since the phasor $\bar{V}_{e1}$ is located on the horizontal axis of the circle diagram, the power factor angle $\phi$ is the angle between the equivalent 6-pole current phasor $\bar{I}_{e1}$ and the horizontal axis. Therefore, the horizontal axis of the circle diagram is a measure of $I_{e1}\cos(\phi)$. The vertical axis in the positive direction (downward) is a measure of $I_{e1}\sin(\phi)$. Consequently the following relation holds:

$$I_{e1}^2 = [I_{e1}\cos(\phi)]^2 + [I_{e1}\sin(\phi)]^2.$$

Substituting this equation into the one above, and dividing by $3R_{e1}$ yields:

$$(V_{e1}/R_{e1})[I_{e1}\cos(\phi)] = -[I_{e1}\cos(\phi)]^2 - [I_{e1}\sin(\phi)]^2 + (P_{ag}/3R_{e1}).$$

Rearranging terms in this result leads to the equation of a circle according to:

$$\{[I_{e1}\cos(\phi)] + (V_{e1}/2R_{e1})\}^2 + [I_{e1}\sin(\phi)]^2 = [(V_{e1}/2R_{e1})^2 + (P_{ag}/3R_{e1})]^{\frac{1}{2}}.$$

The ordinates of the center M of this circle are:

$$x_M = -(V_{e1}/2R_{e1}), \text{ and}$$

$$y_M = 0.$$

Figure 17:
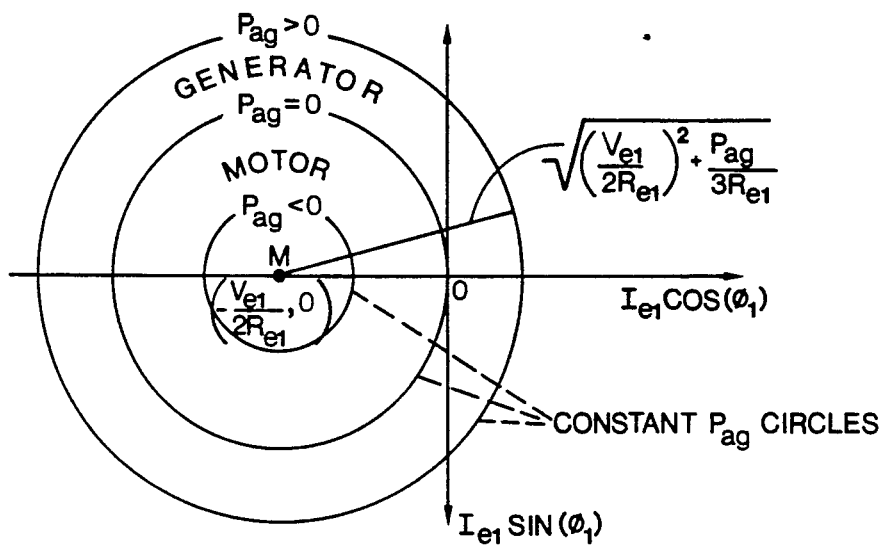
Figure 18:
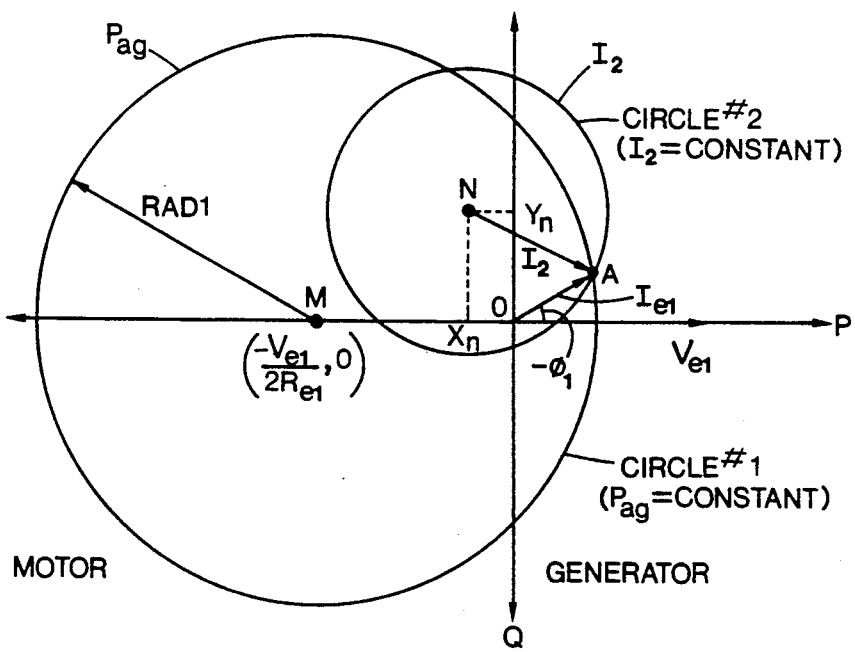

FIG. 17 illustrates concentric circles having different constant values of the air-gap power $P_{ag}$. The circle representing zero air-gap power passes through the origin. Generator operation of the brushless doubly-fed machine corresponds to air-gap powers which are greater than zero, while motor operation corresponds to air-gap powers which are less than zero, as shown in FIG. 17.

(4) Significance of the Circle Diagram

Any point on the circle diagram represents an operating condition. The location of the operating point on the circle diagram reflects the status of all important variables of the brushless doubly-fed machine. FIG. 18 shows such an operating point at point A. The operating point A is at the intersection of the circles for the constant 6-pole current, the constant 2-pole current, and the constant air-gap power or electromagnetic torque. Also, the power factor and the active and reactive power at the 6-pole terminals of the brushless doubly-fed machine are known.

In addition to reflecting the status of the machine, an operating point on the circle diagram also indicates the requirements to obtain this operating condition. For example, consider initial operation at point A in FIG. 18. This condition corresponds with a certain amount of air-gap power $P_{ag}$ associated with circle #1 (point M is the center of this circle) and a certain rms value of the 2-pole current $I_2$ associated with circle #2 (point N as center). Assuming that no change occurs in the load nor in the RPM of the machine, $I_2$ is reduced by the converter.

The circle diagram predicts the effect of this change in the operating conditions. No change in the load and RPM conditions causes the air-gap power to be constant. The reduction of the 2-pole current $I_2$ changes the operating condition from point A to another point determined by the intersection of circle #1 and a constant-$I_2$ circle with a reduced radius. The trajectory of the operating points follows circle #1 until no intersection occurs between circle #1 and a constant-$I_2$ circle. This obviously occurs when the rms value of the 2-pole current $I_2$ is reduced to below a certain value. This value is the radius of a constant-$I_2$ circle which is tangent to circle #1.

(d) Requirements for Operation in the Synchronous Mode

Synchronous operation of the brushless doubly-fed machine under changing load conditions (power and shaft speed) is maintained by controlling the excitation current $I_2$ with the converter 40. In predicting the trajectory of the operating conditions (points) on the circle diagram, the effects of these changes and controls on the centers M and N of the constant $P_{ag}$ circles and the constant $I_2$ circles are defined. The formulas defining the ordinates of centers M and N (see above) depend upon three quantities: $V_{e1}$, $Z_{e1}$ and $R_{e1}$, that is the Thevenin equivalent values for the 6-pole first stator system of voltage, synchronous impedance and resistance.

Since the terminals of the 6-pole system are connected directly to the power grid 32, the voltage $V_{e1}$ is assumed to be constant. However, $R_{e1}$ and $Z_{e1}$ are dependent upon the 6-pole slip $s_1$, which in turn depends upon the shaft speed according to the equation:

$$RPM = (60)(f_m) = (60)(1s - 1)(f_1/n_1).$$

Thus, it is apparent that the locations of centers M and N for the constant $P_{ag}$ circles and for the $I_2$ circles depend upon the shaft speed. It appears that synchronous operation with shaft speeds at, below and beyond the synchronous speed (i.e. slip equal to or greater than zero) is quite feasible.

Figure 19:
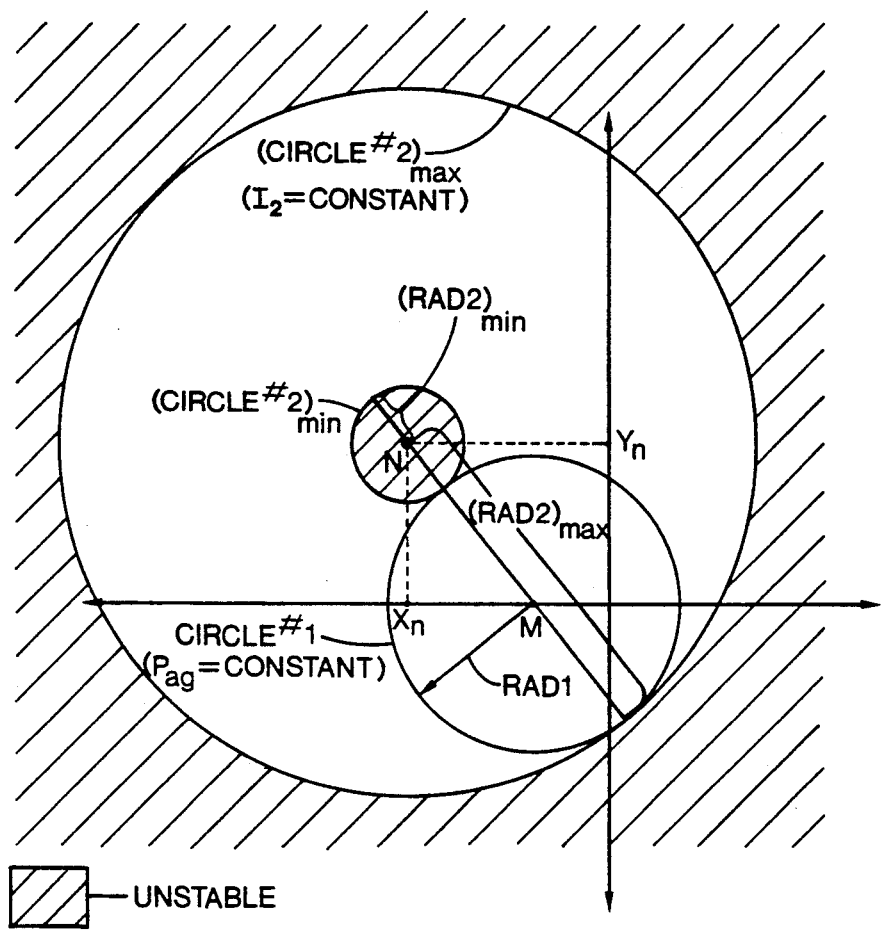

The apparent requirements for synchronous operation of the brushless doubly-fed machine are explained with reference to the circle diagram of FIG. 19. Assuming that the brushless doubly-fed machine converts a certain amount of mechanical input power $P_{em}$ at a certain shaft speed corresponding to a certain slip value s, the air-gap power is determined from the equation $P_{ag} = P_{em}/(1-s)$. FIG. 19 illustrates this air-gap power circle as having a center M and a radius Rad1. The slip-dependent location of point N, the center of the constant $I_2$ circles (circle #2) is also illustrated in FIG. 19.

Synchronous operation occurs when the converter 40 supplies an rms value of the 2-pole current $I_2$ such that the corresponding constant $I_2$ circle intersects with the constant $P_{ag}$ circle (circle #1). From this, it may be concluded that synchronous operation in the shaded area of FIG. 19 is not possible, i.e. if $I_2$ is beyond the limits of $(Rad2)_{min}$ and $(Rad2)_{max}$. These minimum and maximum limits are found from the radius values of the respective inner and outer constant $I_2$ circles which are tangent to the $P_{ag}$ circle.

Such an analysis may easily be performed by computer analysis by inputting the mechanical power-speed characteristics of the load. Such characteristics may be ramp-like in nature, or cubic. For the mechanical load having given shaft-speed conditions, the location of the centers M and N may be determined by the equations above. From this, minimum and maximum values of the required 2-pole current may be determined.

(e) Control for the Synchronous Mode of Operation

From the above, it is believed that synchronous operation of the brushless doubly-fed machine may be assured if the rms value of the 2-pole second stator system current $I_2$ is controlled so that the reactive power Q at the 6-pole first stator system terminals is equal to zero under all circumstances. In implementing this control strategy, it is also believed that the minimum and maximum values for $I_2$ are never exceeded.

The synchronous mode may further be studied by substituting into the above equations various values of the mechanical load for a motor and varying values of slip. For example, under no load conditions where any losses are merely caused by the mechanical structure and bearings of the machine, a decreasing slip value causes the radius of the constant air-gap power $P_{ag}$ circles to decrease, as well as causing the circle centers M to move closer to the origin. However, the location of the center N for the constant $I_2$ circles does not significantly change for changing values of slip. Thus, it is apparent that synchronous operation requires the 2-pole current $I_2$ to be adjusted by the converter 40 within minimum and maximum values which decrease with decreasing slip values.

By substituting full load characteristics for the mechanical load and varying values of slip into the above equations, synchronous operation characteristics for the machine are similar to those for the no load condition. However, the full load rate of decrease of the maximum and minimum values of $I_2$ with decreasing values of slip is not as high as the rate of decrease for the no load characteristics. Under full load conditions, the radius of the constant $P_{ag}$ circles does not decrease considerably as the slip is decreased.

Thus, for synchronous operation the converter 40 controls the rms value of the 2-pole second stator system current within a certain range which is dependent upon the shaft speed. A convenient control strategy is to control the reactive power is by means of a reactive power controller. An analysis of the circle diagrams as outlined above, indicates that synchronous operation may be obtained if the rms value of the 2-pole current $I_2$ is controlled so that the reactive power Q at the 6- pole terminals of the machine is equal to zero under all circumstances. Since synchronous operation may be assured if a constant $I_2$ circle intersects with a constant $P_{ag}$ circle, holding Q equal to zero provides such an intersection.

The above derivations, calculations and conclusions have been for operation of the brushless doubly-fed machine under steady-state conditions. Transient conditions may occur when changing from one operating state to another, that is during changes in the frequency and/or amplitude of the excitation power supplied by converter 40. It is apparent that slowing these changes in the excitation power will decrease the occurrence of transient phenomena. Transient conditions may also occur during load changes from the external system, that is from the mechanical load 34. The natural damping of the system will eliminate some of these transients. Additionally, the transients may be avoided by maintaining operation within the stable steady-state transient limits of the particular machine. Thus, transient control of the present invention is provided by slowing the changes from one operating state to another.

While the above derivations, equations and conclusions have been in terms of the second stator system current for a converter 40 operated in a controllable current source mode, it is apparent that analogous derivations, equations and conclusions may be drawn in terms of the second stator system voltage for a converter operating in a controllable voltage source mode.

Referring to FIGS. 1, 2 and 3, the present invention provides a method of controlling the AC variable speed drive 36 and of controlling the motor 50 driving a load at infinitely variable speeds between substantially zero speed and an upper speed limit, while maintaining substantially synchronous operation of the motor at any such speed. To implement this, the VSD systems 30, 30' and 30" each include controller means, illustrated as brushless doubly-fed motor controllers 80, 80' and 80", respectively. The VSD systems also include sensor means for sensing or monitoring a parameter of the power received by motor 50 from the grid 32 and for producing a power input or sensor signal corresponding to the monitored parameter.

In FIGS. 1 and 2, the sensor means comprises a reactive power sensor 82 for monitoring a reactive power component of the power applied to the drive 36 or 36' by the grid 32. Corresponding to the sensed reactive power component, the reactive power sensor 82 produces a reactive power sensor signal. The reactive power sensor signal is received and processed by the respective controllers 80, 80' as described further below, to control the power factor of the respective drives 36, 36' as seen from the grid, irrespective of variations in the load 34.

In FIG. 3, the sensor means comprises a power factor angle sensor 84 for monitoring a power factor angle of the power applied to the drive 36" by the grid 32. Corresponding to the sensed power factor angle, the power factor angle sensor 84 produces a power factor angle sensor signal. The power factor angle sensor signal is received and processed by the controller 80", as described further below, to control the power factor of the drive 36" as seen from the grid, irrespective of variations in the load 34.

For the external converter power source 39 of FIG. 1, the sensor pick-up may be located at any point along conductors 62, internal or external to the drive, without affecting control of the power factor of the drive 36 as seen from the grid. Such location of the sensor means pick-up would also be suitable for a converter 40 or 40' which draws power directly from the grid 32 (not shown) at a constant known power factor, such as unity power factor. Since such a converter affects the power factor angle of the drive as seen from the grid 32 in a known manner, this type of converter may be compensated for by adjustment of the controller. An example of such a converter is described in U.S. Pat. No. 4,096,557 to Schwarz.

For a converter 40 or 40' which draws power directly from the grid 32 (not shown) at an inconsistent, varying or an unknown power factor, a converter power sensor (not shown) may be included. Such a converter power sensor senses the reactive power or power factor angle of the power drawn by the converter and provides a corresponding sensor signal to the controller. The controller may compensate for the reactive power drawn by the converter which affects the power factor of the drive as seen from the grid, thereby providing overall power factor control for the drive system.

To control the power factor of the drive as seen from the grid for the tapped converter power source of FIGS. 2 and 3, the pick-ups of respective sensors 82 and 84 are located along conductors 62 to the grid side of the tapping means 38'.

The sensors 82 and 84 include conventional circuitry and transducers, such as Hall effect-type current transducers and voltmeters, to monitor the voltage and current received, to determine therefrom the reactive power components and power factor angles, and to produce the corresponding sensor signals.

In FIGS. 1 and 2, the controllers 80 and 80' each include reference means comprising respective reactive power reference means 90 and 90', for establishing a reference signal comprising a reactive power reference signal, according to a desired motor operation strategy. The limited reactive power reference means 90 of FIG. 1 is described further below. The reference signal or value established by the reactive power reference means 90, 90' corresponds to a desired power factor of the drive 36 as seen from the grid 32. For example, if the drive is to receive power from the grid at unity power factor, the reactive power reference signal corresponds to a reactive power of zero.

Other power factors of the drive are also possible, and synchronous operation is maintained if the reactive power reference signal chosen by the desired motor operation strategy is constrained within minimum and maximum reactive power limits. Choices outside of these limits results in an induction mode of operation of motor 50. These limits will vary for each particular motor and application, and may be initially established and periodically revised as required.

One manner of controlling the reactive power reference signal selection and setting the minimum and maximum reactive power limits is shown in FIG. 1. To set these limits, the controller 80 includes reactive power limitation means, such as a reactive power limits calibrator 91, which is adjustable by an operator of the system. For a particular given installation, while operating in a synchronous mode, the operator adjusts the reactive power reference signal using reference means 90 until the motor slips into an induction mode of operation. The maximum and minimum reactive power reference signal values at which synchronism is lost are stored within memory means or the like of the reactive power limits calibrator 91. The calibrator 91 then limits the reactive power reference signal established by reference means 90 to selections between the minimum and maximum reactive power limits. The calibrator 91 may be incorporated within the reference means 90 (not shown) to comprise limited reactive power reference means, equivalent in function to the combination of the limited reactive power reference block 90 and the reactive power limits calibrator 91 of FIG. 1.

For the power factor angle sensor 84 of FIG. 3, the controller 80" includes reference means comprising power factor angle reference means 90", for establishing a reference signal comprising a power factor angle reference signal, according to a desired motor operation strategy. The reference signal or value established by the power factor reference means 90" corresponds to a desired power factor of the drive 36" as seen from the grid 32. For example, if the drive is to receive power from the grid at unity power factor, the power factor reference signal corresponds to a unity (one) power factor.

In various applications, such as in an industrial setting where many motors are used, the desired power factor may be unity or a leading power factor, that is the current waveform leads the voltage waveform in time. At unity power factor, the voltage and current waveforms are in phase, that is, neither leading nor lagging one another. The reactive power reference means 90, 90' and the power factor angle reference means 90" may be set at a fixed reference value, or the reference value may be variable. If variable, the reference means 90, 90', 90" may be externally adjusted, such as manually by an operator or by automated means (not shown). This adjustment is made within maximum and minimum reactive power limits to maintain synchronous operation of the motor in the embodiment of FIG. 1. Other limiting means are described further below for the embodiments of FIGS. 2 and 3 to maintain synchronous operation of the motor.

Referring to FIGS. 1, 2 and 3, the controller means 80, 80' and 80" further include comparator means, such as comparators 92 and 92" respectively. The comparator means receive and compare the appropriate power sensor signal with the reference signal to produce a differential power output signal which is representative of the difference between the power sensor signal and the reference signal.

The comparators 92 of FIGS. 1 and 2 each receives the reactive power sensor signal from sensor 82 and the reactive power reference signal from respective reactive power reference means 90, 90'. Comparator 92 compares a negative value of the reactive power sensor signal with a positive value of the reactive power reference signal, to produce therefrom the differential power output signal comprising a differential reactive power output signal.

The comparator 92' of FIG. 3 receives the power factor angle sensor signal from sensor 84 and the power factor angle reference signal from the power factor angle reference means 90". Comparator 92' compares a negative value of the power factor angle sensor signal with a positive value of the power factor angle reference signal, to produce therefrom the differential power output signal comprising a differential power factor angle output signal.

The controllers 80 and 80" for the converter 40 of FIGS. 1 and 3 operating in a controllable current source mode, further include delay means, such as delay network 94. Here, the differential reactive power and power factor angle output signals produced by the respective comparators of FIGS. 1 and 3 each correspond to a current signal. The delay network 94 receives and delays the differential power output signal received from respective comparators 92 and 92' to produce an amplitude signal comprising a current amplitude signal $i_2$. The excitation power produced by the converter 40 is at a substantially constant voltage.

The controller 80' of FIG. 2 for the converter 40" operating in a controllable voltage source mode, also includes delay means, such as a delay network 94'. Here, the differential reactive power output signal produced by the comparator corresponds to a voltage signal. The delay network 94' receives the differential power output signal from the comparator 92' and delays this signal to produce an amplitude signal comprising a voltage amplitude signal $v_2$. The excitation power produced by the converter 40' is at a substantially constant current.

The comparator means and the respective delay means of each illustrated controller 80, 80' and 80" may be separate components. Alternatively, the comparators of each embodiment may also include the respective delay network, as indicated by the dashed blocks 95, 95' and 95" surrounding comparators and delay networks of FIGS. 1, 2 and 3.

Figure 20:
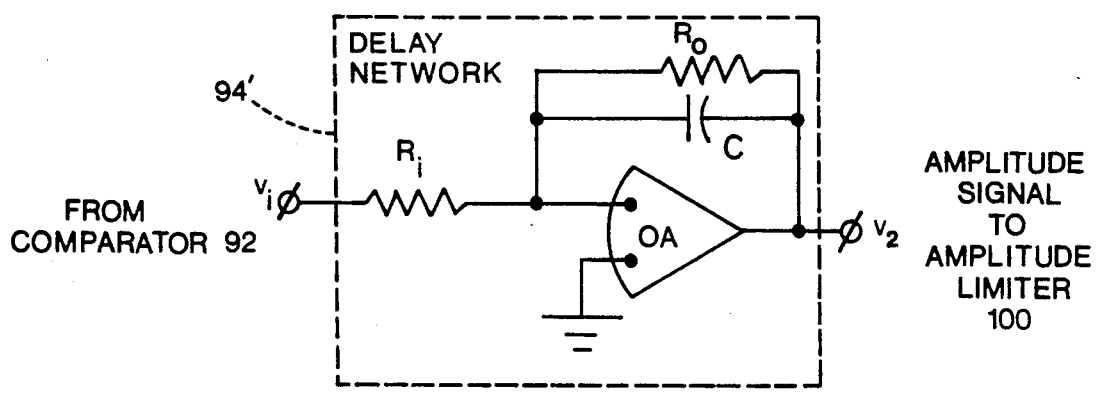
FIG. 20 is a schematic diagram of one form of a delay network of the present invention.

The operation of the delay networks is illustrated in detail by delay network 94' in FIG. 20. The delay network 94' receives the differential reactive power output signal from the comparator 92, illustrated as a voltage input signal $v_i$. The delay network 94' includes resistors $R_i$ and $R_o$, a capacitor C, and an operational amplifier OA. The output voltage of the delay network is the voltage amplitude signal $v_2$. The delay network maintains the ratio of the output voltage $v_2$ to the input voltage $v_i$ as:

$$v_2/v_i = R_o/[R_i(1+ts_o)],$$

with:

$s_o$ denoting the Laplace transform; and t denoting a time constant.

It is apparent that a similar ratio may be established in terms of current signals for the delay network 94 of FIGS. 1 and 3.

The reference means of controllers 80, 80' and 80" in FIGS. 1, 2 and 3 further include a second reference means for establishing a second reference signal. The second reference means comprises speed adjuster means, such as an RPM adjuster 96, for adjusting the speed of motor 50 by producing a controller frequency signal $f_2'$. The excitation frequency $f_2$ of the excitation power fed or injected into the second stator system 56 corresponds to the controller frequency signal $f_2'$. Thus, this frequency or speed reference value $f_2'$ corresponds to a desired motor speed or RPM. The RPM adjuster 96 may be adjusted manually by an operator or by automated means (not shown). Alternatively, the RPM adjuster 96 may be set to a fixed value, if this is in accordance with the desired motor operation strategy.

Referring to FIGS. 2 and 3, to maintain synchronous motor operation the controllers 80' and 80" each have limiter means, such as respective amplitude limiters 100 and 100'. Limiters 100, 100' limit the respective voltage and current amplitude signals $i_2$ and $v_2$ to a value between minimum and maximum limits. These limits vary depending upon the requirements of the load 34 and the total slip s required of motor 50 by the controller ($s=f_2/f_1$).

For example, the amplitude limiter 100' of FIG. 3 receives the current amplitude signal $i_2$ from the delay network 94 and the controller frequency signal $f_2'$ from the RPM adjuster 96. From the known system frequency $f_1$ of the grid 32, a corresponding system frequency value $f_1'$ may be established. From these values, the amplitude limiter 100' to determines the total slip s according to the equation $s=f_2'/f_1'$, where $f_1'$ and $f_2'$ have been similarly scaled in establishing the correspondence with respective frequencies $f_1$ and $f_2$.

The power-speed requirements of the load 34 vary vertical placement of the $v_2$ and $i_2$ maximum and minimum curves on the total slip versus excitation amplitude graphs, which are stored within respective memory means of the amplitude limiters 100 and 100' of FIGS. 2 and 3. A shaded window on each graph located between the maximum and minimum amplitude curves defines excitation amplitude values which produce synchronous operation of the motor 50. Values of $v_2$ or $i_2$ outside of the respective windows result in operation of the motor in the induction mode.

Motors are typically purchased for a particular application. The power-speed requirements for a given load 34 generally fall within one of three categories:

(1) a linear load, such as cranes and elevators;
(2) a quadratic load, such as inertial systems having fly wheels; and
(3) a cubic load, such as fans and pumps.

The load power $P_L$ delivered by the motor 50 to the load 34 varies for each category of load and is dependent upon the speed (RPM) of the motor. Thus, the load power for these categories is:

(1) Linear Load: $P_{LL}=K_1(RPM)+K_2$,
(2) Quadratic Load: $P_{LQ}=K_3(RPM)^2$, and
(3) Cubic Load: $P_{LC}=K_4(RPM)^3$, with load constants $K_1$, $K_3$, $K_4$, and start-up torque $K_2$.

Thus, to vary the vertical placement of the $v_2$ and $i_2$ maximum and minimum curves stored within the amplitude limiters 100, 100' to accommodate the particular load, the controllers 80' and 80" each include initial load selection and calibration means, such as load selector/calibrator 102.

For example, the amplitude limiter 100 may receive one set of $i_2$ maximum and minimum curves, which corresponds to the particular load category application of the motor, from the load selector/calibrator 102. Alternatively, the amplitude limiter 100 may store three sets of $i_2$ maximum and minimum curves, with one set corresponding to each load category above. In this case, the load selector/calibrator 102 may include three choices for the type of load, from which a user selects one to correspond to the user's particular motor application. Upon selection by the user, the amplitude limiter 100 receives a selection signal from the load selector/calibrator 102, and thereafter uses the corresponding set of $i_2$ maximum and minimum curves to limit the excitation current amplitude.

The operation of the amplitude limiters 100, 100' described above contemplates operation at or near full load conditions. Under no-load conditions near synchronous speed (total slip=0), the $v_2$ or $i_2$ maximum and minimum curves and the window defined therebetween are vertically displaced lower than at full load on the total slip versus excitation amplitude graphs. If the amplitude limiter 100, 100' only uses the respective full load $v_2$, $i_2$ maximum and minimum curves, under no-load conditions near synchronous speed the motor may fall out of synchronous operation and into an induction mode of operation.

To compensate for this, load condition sensor means (not shown) may be provided for sensing the condition of the load 34 and for producing a load condition signal. The amplitude limiters 100, 100' may store respective sets of $v_2$, $i_2$ maximum and minimum curves or a curve altering algorithm, corresponding to the various non-full load conditions. Upon receipt of the load condition signal, the amplitude limiter uses the appropriate curves or the curve altering algorithm to limit the excitation voltage or current amplitude according to the condition of the load.

The limited amplitude signal output of the amplitude limiter 100' is shown as $i_2'$ for the converter 40 operating in a controllable current source mode. For the converter 40' operating in a controllable voltage source mode, the amplitude limiter 100 produces a limited amplitude signal $v_2'$.

The controllers 80, 80'and 80" of FIGS. 1, 2 and 3 include signal generator means, such as respective signal generators 98, 98' and 98", which receive the controller frequency signal $f_2'$ from the RPM adjuster 96. The signal generator 98 receives the amplitude signal output $i_2$ from the delay network 94. The signal generator 98' receives the limited voltage amplitude signal output $v_2'$ from the amplitude limiter 100. The signal generator 98" of FIG. 3 receives the limited current amplitude signal output $i_2'$ from the amplitude limiter 100'. Each signal generator 98, 98' and 98" generates a controller signal output from the respective amplitude signal and the controller frequency signal $f_2'$.

For the illustrated 3-phase motor 50 and the converter 40 of FIGS. 1 and 3 operating in a controllable current source mode, the respective signal generators 98 and 98" generate a 3-phase controller signal comprising the phase current controller signals $i_{2a^*}$, $i_{2b^*}$ and $i_{2c^*}$. This controller signal is generated by providing 120° positive and negative phase shifts to the combined received controller frequency and current amplitude signals $f_2'$ and $i_2$. The converter 40 then converts the power received via cables 38 or 38' from the converter power source according to the received controller signal into the required excitation power. Via cables 66, the converter 40 then feeds or injects the excitation power, indicated as $i_{2a}$, $i_{2b}$ and $i_{2c}$, at the controlled excitation frequency and amplitude into the second stator system 56.

Referring to FIG. 2, for the illustrated 3-phase motor 50 and the converter 40' operating in a controllable voltage source mode, the signal generator 98' generates a 3-phase controller signal comprising the phase voltage controller signals $v_{2a^*}$, $v_{2b^*}$ and $v_{2c^*}$ in the same manner as described above for converter 40. This controller signal is received by the converter 40' which converts the power received via cables 38' according to the controller signal to generate the excitation power, indicated as $v_{2a}$, $v_{2b}$ and $v_{2c}$, to excite and thereby control the motor 50.

An example of a suitable signal generator 98, 98', 98" is commercially available from Tektronix, Inc., Tektronix Industrial Park, Beaverton, Oreg. 97077, under the name of TM500 Series Signal Generator.

Thus, in overview, the operation of the controller may be described as having receiving means for receiving the power sensor signal from the appropriate sensors 82 or 84. According to a desired motor operation strategy, the reference means comprises the RPM adjuster 96 which provides a motor speed reference signal in the nature of a frequency signal $f_2'$, corresponding to a desired motor shaft speed. The reference means also includes power reference means which establishes a power reference signal corresponding to the type of sensor employed (power factor angle sensor or reactive power sensor), and to the desired power factor operation of the drive as seen from the grid 32, such as a leading or unity power factor.

The controller further includes processing means for processing the received sensor signal and the established power reference signal. The processing means comprises the comparator and the delay network which cooperate to produce an amplitude signal for controlling the excitation power amplitude. The controller processing means further includes the signal generator which produces the controller signal from the amplitude signal and the motor speed reference signal. To provide synchronous operation of the motor 50, the amplitude signal is constrained within maximum and minimum limits. Such limitation means are provided by limiting the reactive power reference signal selection, or by an amplitude limiter inserted between the delay network and the signal generator.

If the power reference signal, the comparator, the delay network and the amplitude limiter (when employed) are adjusted to control the amplitude of the excitation power, and if the RPM adjuster 96 is adjusted in accordance with a desired control strategy, it is believed that the motor 50 operates according to the above outlined control theory. Operating together, these components comprise means for maintaining motor operation in an induction mode after the motor 50 has slipped from synchronous operation. (Such a transition from a synchronous to an induction mode may occur when the torque requirements of the load 34 exceed the driving torque of the motor.) According to the time delay imposed by the delay network, and within the transient limits of operation of the system, these components also comprise means for resynchronizing or pulling the motor back into synchronous operation from the induction mode.

In the induction mode of operation, the motor draws power from the grid 32 at a lagging power factor, resulting in a corresponding change in the reactive power component of this drawn power. These changes are detected by the reactive power sensor 82. The comparator provides correction for these changes by adjusting the differential power output signal according to the power reference signal. This differential power output signal adjustment corrects the amplitude signal produced at the output of the delay network. The corrected amplitude signal is processed by the signal generator to produce a controller signal that pulls the motor 50 into synchronous operation from the induction mode.

Any unwanted changes in the shaft speed are corrected by the controller frequency signal output of the RPM adjuster. The controller frequency signal is also processed by the signal generator to produce a controller signal that drives the motor 50 at the desired shaft speed. In this manner, the power factor of the drive 36 as seen from grid 32 is controlled irrespective of variations in the load 34, while maintaining substantially synchronous operation of the motor at any speed. "Substantially synchronous operation" merely means that the motor 50 may occasionally slip from synchronous operation into an induction mode of operation, from which correction is applied by the controller as described above to pull the motor back into synchronous operation.

For a brushless doubly-fed motor 50 and power sensors 82 or 84, the controller and the converter may be combined and packaged into one unit comprising a frequency source excitation power generator, or more simply, a frequency generator. Optionally, this frequency generator may also include the power sensor 82 or 84. A converter power sensor (not shown) may be included within or external to the frequency generator if required by the particular converter power source employed.

The associated method of controlling a brushless doubly-fed motor 50 driving a load 34 at infinitely variable speeds between substantially zero speed and an upper speed limit while maintaining substantially synchronous operation at any such speed comprises several steps. This process includes the step of applying power to the first stator system 54 from the electric power grid 32 at the system frequency $f_1$ of the grid. In a monitoring step, a parameter of the power received by the motor 50 from the grid 32 is monitored, and a motor power input signal is produced. In an establishing step, a reference signal is established according to a desired motor operation strategy. In a generating step, excitation power is generated at a controlled frequency and amplitude which are controlled in response to the monitored motor power input signal and the established reference signal. In an injecting step, the excitation power is injected at the controlled frequency and amplitude into the second stator system 56 of the motor 50. In this manner, substantially synchronous operation of the motor 50 is maintained at any such motor speed.

A method is also provided of controlling the brushless doubly-fed motor 50 which may periodically slip from synchronous operation when the torque requirements of the load 34 exceed the driving torque of the motor. In addition to the steps above, this method includes a maintaining step in which motor operation is maintained in an induction mode after the motor has slipped from synchronous operation. In a pulling step, the motor is pulled into synchronous operation or resynchronized from the induction mode of operation by generating excitation power of the required frequency and amplitude for synchronous operation at the increased load torque.

An additional method is also provided by the present invention of controlling the AC variable speed drive 36 having the brushless doubly-fed motor 50 which receives power from grid 32 and drives load 34. The method comprises several steps, including a step of sensing a parameter of the power received by the drive 36 from the grid 32 and producing a power sensor signal corresponding to the sensed parameter. A reference signal is established according to a desired motor operation strategy. In a controlling step, drive 36 is controlled by processing the power sensor signal and the established reference signal and generating a controller signal. In a converting step, power is received from a converter power source and converted according to the controller signal to produce excitation power at an excitation frequency. In a feeding step, the converted excitation power at the excitation frequency is fed to the second stator system 56.

The controlling step of the above method of controlling the VSD drive 36 may include the following additional steps. In a comparing step, the power sensor signal is compared with the established reference signal to produce a differential power output signal representative of the difference between the power sensor signal and the established reference signal. In a delaying step, the differential power output signal is delayed to produce an amplitude signal. In an adjusting step, the speed is adjusted by producing a controller frequency signal which controls the corresponding excitation frequency. In a generating step, the controller signal is generated from the amplitude signal and the controller frequency signal. The converting step further comprises producing the excitation power at an excitation frequency corresponding to the controller frequency signal.

Alternate embodiments are provided to control the power factor of the drive as seen from the grid irrespective of variations in the load. In one such embodiment, the converting step comprises receiving power from the converter power source at unity power factor. In another embodiment, the converting step comprises receiving power from a converter power source which is electrically isolated from the grid 32, as shown in FIG. 1.

Alternate embodiments are provided for sensing different parameters of the power received by the drive 36 to control the power factor of the drive as seen from the grid, irrespective of variations in the load. In one embodiment, the sensing step comprises sensing a reactive power component of the power received by the motor from the grid and producing a reactive power sensor signal. The establishing step comprises establishing a reactive power reference signal. The comparing step comprises comparing the reactive power sensor signal with the established reactive power reference signal to produce therefrom the differential power output signal, as shown in FIGS. 1 and 2.

In another such embodiment, the sensing step comprises sensing a power factor angle of the power received by the motor 50 from the grid 32 and producing a power factor angle sensor signal. The establishing step comprises establishing a power factor angle reference signal. The comparing step comprises comparing the power factor angle sensor signal with the established power factor reference signal to produce therefrom the differential power output signal.

The establishing step may also comprise establishing the reactive power reference signal within minimum and maximum reactive power limits, as shown in FIG. 1. Alternatively, the controlling step may further include the step of limiting the amplitude signal to a value between minimum and maximum limits, as shown in FIGS. 2 and 3.

In the above method of controlling drive 36, the converting step may comprise an additional tapping step. In this tapping step, a portion of the power received by the drive 36 from grid 32 is tapped to serve as the converter power source, as shown in FIGS. 2 and 3.

In summary, the brushless doubly-fed machine operates in a synchronous and an induction mode when controlled according to the control system of the present invention. Operation in a synchronous mode yields many significant advantages over operation in the induction mode and over other drive systems. For example, the machine efficiency in the synchronous mode is higher than in the induction mode. In a certain speed range, the first and second stator systems 54, 56 produce opposing torques in the induction mode, but not in the synchronous mode (see FIGS. 9 and 10). Moreover, in the synchronous mode the RPM value of the shaft speed is predicted by the equation $RPM = (60)[(f_1 - f_2)/(n_1 + n_2)]$. However in the induction mode, the RPM value of the shaft speed is dependent upon the characteristics of the load.

With the first stator system 54 connected directly to a grid 32 having a fixed frequency $f_1$, the shaft speed in the synchronous mode is varied by varying the excitation frequency $f_2$ injected into the second stator system. Thus, it is apparent that a tachometer signal feedback is advantageously not required to control the shaft speed in the synchronous mode.

The brushless doubly-fed machine of the present invention is advantageously simpler to synchronize than a conventional synchronous machine. When a conventional synchronous machine loses synchronism, severe oscillations are encountered which ultimately require the system to be shut down. If the brushless doubly-fed machine of the present invention loses synchronism, system shut down is advantageously not required because the machine merely enters an induction mode of operation from which synchronous operation is easily regained.

Having illustrated and described the principles of my invention with respect to several preferred embodiments, it should be apparent to those skilled in the art that my invention may be modified in arrangement and detail without departing from such principles. For example, the brushless doubly-fed machine may be connected to a grid operating at a system frequency other than 60 Hertz. Also, the present invention could be used in a relatively isolated environment having a grid operating at other system frequencies, for example 400 Hertz. I claim all such modifications falling within the scope and spirit of the following claims.

I claim:

1. A method of controlling a motor driving a load at infinitely variable speeds between substantially zero speed and an upper speed limit, the method comprising the steps of:

providing a motor having a brushless rotor unit without slip rings and with rotor windings, with the motor also having a stator unit with stator windings comprising first and second polyphase stator systems;

applying power to the first stator system from an electric power grid at a system frequency of the grid;

monitoring a parameter of the power received by the motor from the electric power grid and producing a motor power input signal corresponding to the monitored parameter;

establishing a reference signal according to a desired motor operation strategy;

generating excitation power at a controlled frequency and amplitude in response to the monitored motor power input signal and the established reference signal; and injecting the excitation power at the controlled frequency and amplitude into the second stator system for operating the motor with a linear torque-speed characteristic at any motor speed between substantially zero speed and the upper speed limit.

2. A method of controlling a motor driving a load at infinitely variable speeds between substantially zero speed and an upper speed limit while maintaining substantially synchronous operation at any such speed, the motor occasionally slipping from synchronous operation when the torque requirements of the load excessively exceed the driving torque of the motor, the method comprising the steps of:
  providing a motor having a brushless rotor unit without slip rings and with rotor windings, with the motor also having a stator unit with stator windings comprising first and second polyphase stator systems;
  applying power to the first stator system from an electric power grid at a system frequency of the grid;
  monitoring a parameter of the power received by the motor from the electric power grid and producing a motor power input signal corresponding to the monitored parameter;
  establishing a reference signal according to a desired motor operation strategy;
  generating excitation power at a controlled frequency and amplitude which are controlled in response to the monitored motor power input signal and the established reference signal;
  injecting the excitation power at the controlled frequency and amplitude into the second stator system to maintain substantially synchronous operation of the motor at any motor speed between substantially zero speed and the upper speed limit;
  maintaining motor operation in an induction mode while continuing to drive the load after the motor has slipped from synchronous operation by continuing to apply power to the first stator system from the electric power grid at the system frequency of the grid while ceasing to inject excitation power into the second stator system a frequency and amplitude required to maintain synchronous operation at the increased load torque which caused the motor to slip from synchronous operation; and
  pulling the motor into synchronous operation from the induction mode of operation by generating excitation power of the required frequency and amplitude for synchronous operation at the increased load torque.

3. A method of controlling an AC variable speed drive driving a load, the drive having a converter and a brushless doubly-fed motor with a rotor and a stator, the rotor having rotor windings without slip rings and the stator having stator windings comprising first and second polyphase stator systems, the first stator system of the drive receiving power from an electric power grid at a system frequency of the grid, the method comprising the steps of:
  sensing a parameter of the power received by the drive from the electric power grid and producing a power sensor signal corresponding to the sensed parameter;
  establishing a reference signal according to a desired motor operation strategy;
  controlling the drive by processing the power sensor signal and the established reference signal and generating a controller signal;
  converting power received from a converter power source with the converter in response to the controller signal to produce excitation power at an excitation frequency; and
  injecting the converted excitation power at the excitation frequency into the second stator system for operating the motor with a linear torque-speed characteristic at any motor speed between substantially zero speed and an upper speed limit of the motor.

4. A method according to claim 3 wherein the controlling step further comprises the steps of:
  comparing the power sensor signal with the established reference signal to produce a differential power output signal representative of the difference between the power sensor signal and the established reference signal; and
  delaying the differential power output signal to produce an amplitude signal.

5. A method according to claim 4 wherein the controlling step further comprises the steps of:
  adjusting the speed of the motor by producing a controller frequency signal;
  generating the controller signal from the amplitude signal and the controller frequency signal; and
  wherein the converting step comprises producing the excitation power at an excitation frequency corresponding to the controller frequency signal.

6. A method according to claim 3 wherein:
  the converting step comprises receiving power from a converter power source which is electrically isolated from the grid; and
  the controlling step comprises generating the controller signal so as to control the power factor of the drive as seen from the grid irrespective of variations in the load.

7. A method according to claim 4 wherein:
  the sensing step comprises sensing a reactive power component of the power received by the drive from the electric power grid and producing a reactive power sensor signal;
  the establishing step comprises establishing a reactive power reference signal within minimum and maximum reactive power limits; and
  the comparing step comprises comparing the reactive power sensor signal with the established reactive power reference signal to produce therefrom the differential power output signal, so as to control the power factor of the drive as seen from the grid irrespective of variations in the load.

8. A method according to claim 5 wherein:
  the sensing step comprises sensing a reactive power component of the power received by the drive from the electric power grid and producing a reactive power sensor signal;
  the establishing step comprises establishing a reactive power reference signal;
  the comparing step comprises comparing the reactive power sensor signal with the established reactive power reference signal to produce therefrom the differential power output signal; and
  the controlling step further comprises the step of limiting the amplitude signal to a value between minimum and maximum limits, so as to control the power factor of the drive as seen from the grid irrespective of variations in the load.

9. A method according to claim 5 wherein:
  the sensing step comprises sensing a power factor angle of the power received by the drive from the electric power grid and producing a power factor angle sensor signal;
  the establishing step comprises establishing a power factor angle reference signal;
  the comparing step comprises comparing the power factor angle sensor signal with the established power factor angle reference signal to produce therefrom the differential power output signal; and the controlling step further comprises the step of limiting the amplitude signal to a value between minimum and maximum limits, so as to control the power factor of the drive as seen from the grid irrespective of variations in the load.

10. A method according to claim 3 wherein the converting step further comprises the step of tapping a portion of the power received by the drive from the electric power grid to serve as the converter power source.

11. An AC variable speed drive system which receives power from an electric power grid at a system frequency of the grid and drives a mechanical load, the system comprising:

a brushless doubly-fed motor having a rotor and a stator, the rotor having rotor windings without slip rings and the stator having stator windings comprising first and second polyphase stator systems, with the first stator system receiving the power from the grid, and with the motor having an upper speed limit;

sensor means for sensing a parameter of the power received by the drive system from the grid and producing a power sensor signal corresponding to the sensed parameter;

reference means for establishing a reference signal according to a desired motor operation strategy;

controller means for receiving and processing the power sensor signal and the reference signal and for generating a controller signal to operate the motor with a linear torque-speed characteristic; and converter means for receiving and converting power from a converter power source into excitation power having an excitation frequency in response to the controller signal, with the converter means coupled to inject the excitation power into the second stator system at the excitation frequency to operate the motor with the linear torque-speed characteristic at any speed between substantially zero speed and the upper speed limit.

12. An AC variable speed drive system according to claim 11 wherein the controller means comprises:

comparator means for comparing the power sensor signal with the reference signal to produce a differential power output signal representative of the difference between the power sensor signal and the reference signal; and delay means for delaying the differential power output signal to produce an amplitude signal.

13. An AC variable speed drive system according to claim 12 wherein the controller means further comprises:

adjuster means for adjusting the speed of the motor by producing a controller frequency signal; and signal generator means for generating the controller signal from the amplitude signal and the controller frequency signal.

14. An AC variable speed drive system according to claim 13 wherein the converter means comprises a power electronic converter which operates in a controllable current source mode with the amplitude signal being a current amplitude and the excitation power produced by the converter being at a substantially constant voltage.

15. An AC variable speed drive system according to claim 13 wherein the converter means comprises a power electronic converter which operates in a controllable voltage source mode with the amplitude signal being a voltage amplitude and the excitation power produced by the converter being at a substantially constant current.

16. An AC variable speed drive system according to claim 11 wherein:

the converter means receives power from a converter power source which is electrically isolated from the grid; and the controller means generates the controller signal so as to control the power factor of the drive as seen from the grid irrespective of variations in the load.

17. An AC variable speed drive system according to claim 12 wherein:

the sensor means comprises reactive power sensor means for sensing a reactive power component of the power received by the motor from the grid and for producing a reactive power sensor signal;

the reference means establishes a reactive power reference signal within minimum and maximum reactive power limits; and the comparator means compares the reactive power sensor signal with the reactive power reference signal to produce therefrom the differential power output signal, so as to control the power factor of the drive as seen from the grid irrespective of variations in the load.

18. An AC variable speed drive system according to claim 12 wherein:

the sensor means comprises reactive power sensor means for sensing a reactive power component of the power received by the motor from the grid and for producing a reactive power sensor signal;

the reference means establishes a reactive power reference signal;

the comparator means compares the reactive power sensor signal with the reactive power reference signal to produce therefrom the differential power output signal; and the controller means comprises limiter means for limiting the amplitude signal to a value between minimum and maximum limits, so as to control the power factor of the drive as seen from the grid irrespective of variations in the load.

19. An AC variable speed drive system according to claim 13 wherein:

the sensor means comprises power factor angle sensor means for sensing a power factor angle of the power received by the motor from the grid and for producing a power factor angle sensor signal;

the reference means establishes a power factor angle reference signal;

the comparator means compares the power factor angle sensor signal with the power factor angle reference signal to produce therefrom the differential power output signal; and the controller means comprises limiter means for limiting the amplitude signal to a value between minimum and maximum limits, so as to control the power factor of the drive as seen from the grid irrespective of variations in the load.

20. An AC variable speed drive which receives power from an electric power grid at a system frequency of the grid and drives a mechanical load in response to a controller signal received from a controller, the drive comprising:
- a brushless doubly-fed motor having a rotor and a stator, the rotor having rotor windings without slip rings and the stator having stator windings comprising first and second polyphase stator systems, with the first stator system receiving the power from the grid, and with the motor having an upper speed limit; and
- converter means for receiving and converting power from a converter power source into excitation power at an excitation frequency in response to the received controller signal, and for injecting the excitation power at the excitation frequency into the second stator system to drive the load at any speed up to the upper speed limit while operating the motor with a linear torque-speed characteristic irrespective of variations in torque requirements of the load.

21. An AC variable speed drive according to claim 20 wherein the converter means comprises a power electronic converter.

22. An AC variable speed drive according to claim 21 wherein:
- the first and second stator systems share a single common set of stator windings wound on the stator; and
- the rotor windings comprise a plurality of rotor bars equally spaced about the periphery of the rotor, and at least two rotor winding groups, each rotor winding group lying between two of the rotor bars and each rotor group comprising at least one shorted rotor coil.

23. An AC variable speed drive according to claim 22 wherein the first and second stator systems have respectively a first and a second number of pole-pairs, with each pole-pair comprising two poles, the second stator system having at least two poles and the first stator system having at least four more poles than the second stator system.

24. An AC variable speed drive according to claim 23 wherein the number of rotor bars is the sum of the first and the second number of pole-pairs of the first and second stator systems.

25. A frequency source excitation power generator for generating excitation power at a required frequency and amplitude to excite a motor driving a load, the motor having a brushless rotor unit and a stator unit, the rotor unit having rotor windings without slip rings and the stator unit having stator windings comprising first and second polyphase stator systems, with the first stator system receiving power from an electric power grid at a system frequency of the grid, and the second stator system receiving the excitation power, the frequency source excitation power generator for use with a sensor for sensing a parameter of the power received by the motor from the grid and for producing a power sensor signal corresponding to the sensed parameter, the frequency source excitation power generator comprising:
- a controller comprising reference means for establishing a reference signal in accordance with a desired motor operation strategy, the controller for receiving and processing the power sensor signal with the reference signal and for producing a controlled frequency and amplitude signal to operate the motor with a linear torque-speed characteristic; and
- a converter for converting the power received from a converter power source into excitation power of variable frequency and amplitude in response to the controlled frequency and amplitude signal, and for injecting the excitation power into the second stator system to operate the motor with the linear torque-speed characteristic at a speed and torque required to drive the load according to the desired motor operation strategy.

26. A frequency source excitation power generator for generating excitation power at a required frequency and amplitude to excite a motor driving a load, the motor having a brushless rotor unit and a stator unit, the rotor unit having rotor windings without slip rings and the stator unit having stator windings comprising first and second polyphase stator systems, with the first stator system receiving power from an electric power grid at a system frequency of the grid, and the second stator system receiving the excitation power, the frequency source excitation power generator for use with a sensor for sensing a parameter of the power received by the motor from the grid and for producing a power sensor signal corresponding to the sensed parameter, the motor occasionally slipping from synchronous operation when the torque requirements of the load excessively exceed the driving torque of the motor, the frequency source excitation power generator comprising:
- a controller comprising reference means for establishing a reference signal in accordance with a desired motor operation strategy, the controller for receiving and processing the power sensor signal with the reference signal and for producing a controlled frequency and amplitude signal, the controller also including means for maintaining motor operation in an induction mode after the motor has slipped from synchronous operation by continuing to apply power to the first stator system from the electric power grid at the system frequency of the grid while ceasing to inject excitation power into the second stator system a frequency and amplitude required to maintain synchronous operation at the increased load torque which caused the motor to slip from synchronous operation, and with the controller further including means for pulling the motor into synchronous operation from the induction mode of operation by generating excitation power of the required frequency and amplitude for synchronous operation at the increased load torque; and
- a converter for converting the power received from a converter power source into excitation power of variable frequency and amplitude in response to the controlled frequency and amplitude signal, and for injecting the excitation power into the second stator system to maintain substantially synchronous operation of the motor at a speed and torque required to drive the load according to the desired motor operation strategy;
- wherein the controlled frequency and amplitude signal is produced in response to the means for maintaining motor operation in an induction mode and the means for pulling the motor into synchronous operation.

27. An AC variable speed drive controller for controlling an AC variable speed drive driving a load, the drive receiving power from an electric power grid at a system frequency of the grid, the drive comprising a brushless doubly-fed motor and a power electronic converter, the motor having a rotor and a stator unit, the rotor having rotor windings and the stator unit having stator windings comprising first and second polyphase stator systems, the motor having an upper speed limit, the power electronic converter receiving power from a converter power source and producing therefrom excitation power at an excitation frequency, the first stator system receiving power from the grid and the second stator system receiving the excitation power from the power electronic converter, the controller comprising:

reference means for establishing a reference signal according to a desired motor operation strategy; and a processor for processing a power sensor signal and the reference signal, the power sensor signal produced by a power sensor which senses a parameter of the power received by the motor from the grid and produces the power sensor signal in response to the sensed parameter, the processor generating therefrom a controller signal for delivery to the power electronic converter which produces the excitation power at the excitation frequency in response to the controller signal, the processor generating the controller signal to drive the load according to the desired motor operation strategy irrespective of variations in the load by controlling the excitation power received by the second stator system of the motor to operate the motor with a linear torque-speed characteristic at any speed up to the upper speed limit.

28. An AC variable speed drive controller according to claim 27 wherein:

the reference means comprises power reference means and speed reference means for establishing respective power and motor speed reference signals; and the controller further includes a comparator for comparing the power sensor signal with the power reference signal to produce a differential power output signal representative of the difference between the power sensor signal and the power reference signal, a delay device for delaying the differential power output signal to produce an amplitude signal, and a signal generator for generating the controller signal from the amplitude signal and the motor speed reference signal to control the excitation frequency in response to the motor speed reference signal for driving the load at a selected speed.

29. An AC variable speed drive controller according to claim 28 wherein:

the power sensor signal comprises a power factor angle sensor signal corresponding to the power factor angle of the power received by the motor from the grid;

the power reference signal comprises a power factor angle reference signal; and the controller further comprises a limiter for limiting the amplitude signal to a value between minimum and maximum amplitude limits.

30. An AC variable speed drive controller according to claim 28 wherein:

the power sensor signal comprises a reactive power sensor signal corresponding to the reactive power of the power received from the grid; and the power reference signal comprises a reactive power reference signal.

31. An AC variable speed drive system which receives power from an electric power grid at a system frequency of the grid and drives a mechanical load, the system comprising:

a brushless doubly-fed motor having a brushless rotor unit without slip rings and with rotor windings, and a stator with stator windings comprising first and second polyphase stator systems, the first stator system receiving the power from the grid;

a sensor of a type which senses a parameter of the power received by the drive system from the grid and produces a power sensor signal corresponding to the sensed parameter;

a reference device which establishes a reference signal according to a desired motor operation strategy;

a controller for generating a controller signal in response to the power sensor signal and the reference signal to operate the motor with a linear torque-speed characteristic; and a converter for converting power from a converter power source in response to the controller signal to produce therefrom excitation power at an excitation frequency, with the converter coupled to the motor for injecting the excitation power into the second stator system at the excitation frequency for linear torque-speed characteristic motor operation.

32. An AC variable speed drive which receives power from an electric power grid at a system frequency of the grid and drives a mechanical load in response to a controller signal received from a controller, the drive comprising:

a brushless doubly-fed motor having a brushless rotor unit without slip rings and with rotor windings, and having a stator with stator windings comprising first and second polyphase stator systems, the first stator system receiving the power from the grid; and a converter of a type which receives and converts power from a converter power source in response to the received controller signal to produce excitation power at an excitation frequency, with the converter coupled to the motor to inject the excitation power into the second stator system at the excitation frequency to operate the motor with a linear torque-speed characteristic for driving the load irrespective of variation in torque requirements of the load.

33. A frequency source excitation power generator for generating excitation power at a required frequency and amplitude to excite a motor driving a load, the motor having a brushless rotor unit without slip rings and with rotor windings and a stator unit with stator windings comprising first and second polyphase stator systems, the first stator system receiving power from an electric power grid at a system frequency of the grid, and the second stator system receiving the excitation power, the frequency source excitation power generator for use with sensor means for sensing a parameter of the power received by the motor from the grid and for producing a power sensor signal corresponding to the sensed parameter, the frequency source excitation power generator comprising:

a control device including a reference device of a type which establishes a reference signal in accordance with a desired motor operation strategy, with the control device receiving and processing the power sensor signal with the reference signal and producing therefrom a controlled frequency and amplitude signal to operate the motor with a linear torque-speed characteristic; and a converter of a type which converts the power received from a converter power source into excitation power of variable frequency and amplitude in response to the controlled frequency and amplitude signal, the converter being capable of being coupled to the motor to inject the excitation power into the second stator system for operating the motor with the linear torque-speed characteristic at a speed and torque required to drive the load according to the desired motor operation strategy.

* * * * *